(12) United States Patent
Okayama et al.

(10) Patent No.: US 6,441,968 B1
(45) Date of Patent: Aug. 27, 2002

(54) ZOOM LENS AND VIDEO CAMERA AND ELECTRONIC STILL CAMERA USING THIS

(75) Inventors: Hiroaki Okayama, Nara; Shusuke Ono, Osaka; Masaki Hirokoh, Hyogo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/582,915

(22) PCT Filed: Jan. 12, 1999

(86) PCT No.: PCT/JP99/00088
§ 371 (c)(1),
(2), (4) Date: Jul. 7, 2000

(87) PCT Pub. No.: WO99/36821
PCT Pub. Date: Jul. 22, 1999

(30) Foreign Application Priority Data

Jan. 14, 1998 (JP) .......................................... 10/005889

(51) Int. Cl.[7] .......................... G02B 15/14; G02B 13/02
(52) U.S. Cl. ...................... 359/687; 359/684; 359/686; 359/745; 359/747
(58) Field of Search ................................. 359/687, 686, 359/684, 745, 747, 754, 771, 774

(56) References Cited

U.S. PATENT DOCUMENTS 6,226,130 B1 * 5/2001 Mukaiya ..................... 359/687

* cited by examiner

Primary Examiner—Georgia Epps
Assistant Examiner—Michael A. Lucas
(74) Attorney, Agent, or Firm—Merchant & Gould PC

(57) ABSTRACT

A zoom lens comprising, in the order of an increasing distance from an object; a fixed first lens group (1) having a positive refractive power; a second lens group (2) containing an aspherical surface, having a negative refractive power and being in charge of a variable power action by being moved; a fixed third lens group (3) containing an aspherical surface and having a positive refractive power; and a fourth lens group (4) containing an aspherical surface, having a positive refractive power and moving while following up a moving object point; wherein the surface on the image plane side of a lens positioned closest to the image plane in the third lens group (3) has a concave plane having a strong refractive power with respect to the image plane and a relation, 2.0<L/CL1<2.3, is satisfied when an effective aperture of a lens (1a) positioned closest to the object in the first group is CL1 and a distance from the lens (1a) to the image plane is L, whereby a high magnification, compact and wide-angle zoom lens having its aberration adequately corrected can be obtained with a simple configuration.

10 Claims, 35 Drawing Sheets

ZOOM LENS AND VIDEO CAMERA AND ELECTRONIC STILL CAMERA USING THIS

TECHNICAL FIELD

The present invention relates to a zoom lens suitably used for a video camera using an imaging device, etc., and having a wide angle of view of 60° or more, a high zoom ratio of about 10 times and a reduced full length.

BACKGROUND ART

Examples of conventional zoom lenses include a zoom lens described in Publication of Japanese Patent Application No. (Tokugan Hei) No. Hei-8-114092. Hereinafter, one example of the above-mentioned conventional zoom lens will be explained with reference to the drawings. FIG. 35 is a view showing a configuration of a zoom lens for a video camera of the prior art.

A zoom lens shown in FIG. 35 includes a first lens group 351 as a light beam condenser, a second lens group 352 as a variable power, a third lens group 353 as a light beam condenser, a fourth lens group 354 as a focus portion, an equivalent glass plate 355 corresponding to a quartz filter, a face-plate of an image pick-up device, or the like, and an image plane 356.

The first lens group 351 fixed with respect to the image plane 356 is in charge of an image pick-up action. The second lens group 352, moving forward and backward on an optical axis, changes the focal distance of the entire lens system by changing the magnifications. The fixed third lens group 353 is in charge of an action of condensing divergent light beams generated by the second lens group. The fourth lens group 354, moving forward and backward on the optical axis, is in charge of a focusing action.

Furthermore, the change of the image plane position due to the movement of the second lens group 352 during zooming is corrected so that an image is formed at a constant position by the movement of the fourth lens group 354, thereby keeping the image plane at a constant position.

Recently, in the video camera market, downsizing of an image pick up device and lens system has been strongly demanded. Furthermore, recently, it is an important requirement that electronic still cameras, which emerge in the market with the popularity of multimedia personal computers, are cheap and small.

However, in the above-mentioned conventional zoom lens, the number of lenses is ten and the zoom ratio of about 10 times is high, however, the full length of the zoom lens is relatively long with respect to the effective aperture of the lens positioned closest to the side of an object. Such a zoom lens does not have a compact size and cannot satisfy the demands of downsizing and high performance. Moreover, in the conventional methods for designing the zoom lens, it was difficult to satisfy all demands, namely, a large aperture, high magnification, a small size, and high degree of resolution.

DISCLOSURE OF INVENTION

It is therefore an object of the present invention to solve the above-mentioned problems of the conventional zoom lens and to provide a zoom lens having a compact size and wide angle of view, namely, a zoom lens having a few lenses, a zoom ratio of about 10 times, an angle of view of approximately 60° or more, and to provide a video camera and an electronic still camera using the zoom lens.

According to the present invention, a zoom lens includes a first lens group having a positive refractive power and being fixed with respect to an image plane, a second lens group having a negative refractive power and being in charge of a variable power action by being moved on an optical axis, a third lens group having a positive refractive power and being fixed with respect to the image plane, and a fourth lens group having a positive refractive power and moving on the optical axis so that it keeps the image plane following up the movement of the second lens group and the object at a constant position with respect to a standard plane, wherein the first lens group includes, in the order of an increasing distance from the object, a lens having a negative refractive power, a lens having a positive refractive power, and a meniscus lens having a positive refractive power and having a convex surface facing the object side; the second lens group includes, in the order of an increasing distance from the object, a lens having a negative refractive power, a biconcave lens having a negative refractive power, and a lens having a positive refractive power, having a convex surface facing the object side, and being connected to the biconcave lens; the third lens group includes, in the order of an increasing distance from the object, a biconvex lens having a positive refractive power, a lens having a positive refractive power and having a convex surface facing the object side, and a lens having-a negative refractive power, wherein the lens having a negative refractive power of the third lens group is connected to the lens having a positive refractive power and having a convex surface facing the object side of the third lens group, the lens having a negative refractive lens of the third lens group has a concave surface facing the side of the image plane, and the connected lenses as a whole have negative refractive power; the forth lens group includes one lens; each of the second lens group, the third lens group and the fourth lens group contains at least one aspherical surface; and the following relationships are satisfied: $2.0<L/CL1<2.3$, $0.2<f4/L<0.35$, and $0.3<fw/f4<0.4$, where CL1 is an effective aperture of the lens positioned closest to the object in the first lens group, L is a distance between the lens positioned closest to the object in the first lens group and the image plane, f4 is a focal distance of the fourth lens group, and fw is a focal distance at a wide-angle end.

According to the above-mentioned zoom lens, a high magnification, compact and wide-angle zoom lens having its aberration adequately corrected can be obtained with a simple configuration. In addition, the sufficient back focus and wide angel of view ca be obtained. Moreover, the full length of the lens can be reduced.

Next, a second zoom lens of the present invention includes, in the order of an increasing distance from an object, a first lens group having a positive refractive power and being fixed with respect to an image plane, a second lens group having a negative refractive power and being in charge of a variable power action by being moved on an optical axis, a third lens group having a positive refractive power and being fixed with respect to the image plane, and a fourth lens group having a positive refractive power and moving on the optical axis so that it keeps the image plane following up the movement of the second lens group and the object at a constant position with respect to a standard plane, wherein the first lens group comprises, in the order of an increasing distance from the object, a lens having a negative refractive power, a lens having a positive refractive power, and a meniscus lens having a positive refractive power and having a convex surface facing the object side; the second lens group comprises, in the order of an increasing distance from the object, a lens having a negative refractive power, a biconcave lens having a negative refractive power, and a lens having a positive refractive power, having a convex surface facing the object side, and being connected to the biconcave lens; the third lens group comprises, in the order of an increasing distance from the object, a biconvex lens having a positive refractive power, a lens having a positive refractive power and having a convex surface facing the object side, and a lens having a negative refractive power, wherein the lens having a negative refractive power of the third lens group is positioned with an air space with respect to the lens having a positive refractive power and having a convex surface facing the object side of the third lens group; the fourth lens group comprises one lens; each of the second lens group, the third lens group and the fourth lens group contains at least one aspherical surface; and the following relationships are satisfied: $1.8 < L/CL1 < 2.3$, $0.2 < f4/L < 0.35$, and $0.25 < fw/f4 < 0.4$, where CL1 is an effective aperture of the lens positioned closest to the object in the first lens group, L is a distance from the lens positioned closest to the object in the first lens group to the image plane, f4 is a focal distance of the fourth lens group and fw is a focal distance at a wide-angle end.

According to such a zoom lens, the aberration can adequately be corrected by an interaction of the lenses. A compact and wide-angle lens having a high magnification can be obtained with a simple configuration. Furthermore, the sufficient back focus and a wide angle of view can be obtained, and the full length of the lens can be reduced.

It is further preferable in each of the above-mentioned zoom lenses that a zoom ratio is approximately 10 times. According to such a zoom lens, a compact and wide-angle zoom lens having a high magnification can be obtained.

Next, the video camera of the present invention is characterized by using any of the above-mentioned zoom lenses. According to the above-mentioned video camera, by using the zoom lens of the present invention, a small and lightweight video camera having high performance can be realized.

Next, the electronic still camera of the present invention is characterized by using any of the above-mentioned zoom lenses. According to the above-mentioned electronic still camera, since it uses the zoom lens of the present invention, a small and lightweight electric still camera having high performance can be realized.

BEST MODE FOR CARRYING OUT THE INVENTION (First Embodiment)

Figure 1:
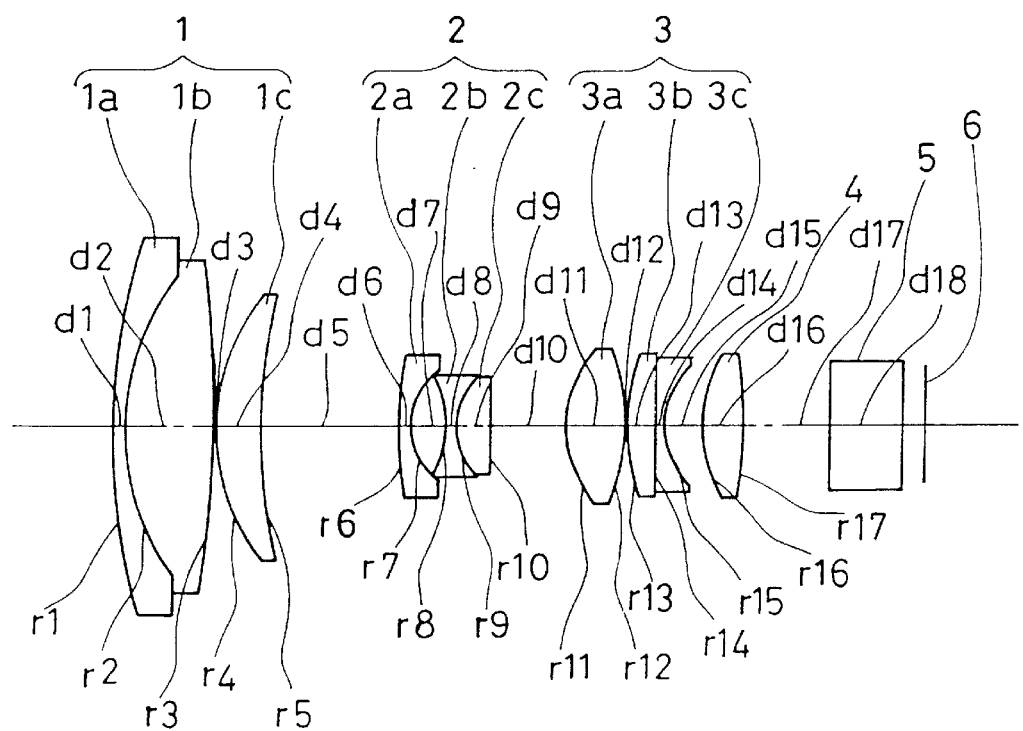
FIG. 1 is a view showing a configuration of a zoom lens according to a first embodiment of the present invention.

FIG. 1 is a view showing a configuration of a zoom lens according to a first embodiment. The zoom lens shown in FIG. 1 includes, in the order of an increasing distance from an object, a first lens group 1 having a positive refractive power and being fixed with respect to an image plane 6, a second lens group 2 having a negative refractive power and being in charge of a variable power action by being moved on an optical axis, a third lens group 3 having a positive refractive power, being fixed with respect to the image plane and being in charge of a beam-condensing action, and a fourth lens group 4 having a positive refractive power and moving on the optical axis so that it keeps the image plane following up the movement of the second lens group and the object at a constant position with respect to a standard plane. In addition, between the fourth lens group 4 and the image plane 6, there is provided a plate 5 that is equivalent to an optical low-pass filter, a faceplate of an image pick-up device, or the like.

The first lens group 1 includes, in the order of an increasing distance from the object, a lens 1a having a negative refractive power, a lens 1b having a positive refractive power, and a meniscus lens 1c having a positive refractive power and having a convex surface facing the object side.

The second lens group 2 includes, in the order of an increasing distance from the object, a lens 2a having a negative refractive power, a biconcave lens 2b and a lens 2c having a positive refractive power. At least one surface of the above-mentioned lenses is an aspherical surface.

The third lens group 3 includes, in the order of an increasing distance from the object, a biconvex lens 3a having a positive refractive power and provided with aspherical surfaces on both surfaces, a lens 3b having a positive refractive power and having a convex surface facing the object side, and a lens 3c having a negative refractive power. In particular, the lens 3b having a positive refractive power and the lens 3c having a negative refractive power are connected with each other, and the positive refractive power of the biconvex lens 3a is set to be relatively stronger than the refractive power corresponding to that of the combined focal distance of the connected lenses 3b and 3c.

With such a configuration, although it is very compact, the sufficient back focus can be obtained and at the same time, the aberration can adequately be corrected.

The fourth lens group 4 includes one biconvex lens, and an aspherical surface is formed on the lens of the object side.

In FIG. 1, ri (i=1 to 17) represents a radius of curvature of each lens, and dk (k=1 to 18) represents a wall thickness of each lens or an air space between the lenses.

The zoom lens of this embodiment satisfies the relationships expressed by the following equations (1) to (3):

$$2.0 < L/CL1 < 2.3 \qquad \text{Equation (1)}$$

$$0.2 < f4/L < 0.35 \qquad \text{Equation (2)}$$

$$0.3 < fw/f4 < 0.4, \qquad \text{Equation (3)}$$

wherein CL1 is an effective aperture of the lens 1a positioned closest to the object in the first lens group, L is a distance from the lens 1a positioned closet to the object of the first lens group to the object, f4 is a focal distance of the fourth lens group, and fw is a focal distance at a wide-angle end.

Equation (1) represents the relationship between the full length and the angle of view. If L/CL1 is less than the lower limit, in order to satisfy the conditions of the focal distance and the back principal point of the first lens group necessary to fabricate a compact zoom lens, the wall thickness of the first lens group for securing an effective aperture is increased, whereby it is difficult to obtain a sufficient aberration correction. Consequently, a zoom lens can be compact and have a sufficient angle of view, however, the sufficient aberration performance of an entire zoom lens system cannot be secured.

The conditions of the focal distance and the position of the back principal point for the first lens group necessary to fabricate a compact zoom lens are described. The focal distance is required to be determined in accordance with the focal distance of the second lens group, which was determined taking the Petzval sum into account, in order to fabricate a compact zoom lens. The back principal point is required to be determined so that the movement of the second lens group and the fourth lens group are minimized and the closest interval between the first lens group and the second lens group is sufficiently reduced.

On the other hand, if L/CL1 is more than the upper limit, the effective aperture of the lens 1a is small with respect to the limitation of the full length L for attaining a compact zoom lens. As a result, a sufficient angle of view cannot be obtained.

Equation (2) represents the relationship between a back focus and an angle of view. If f4/L is less than the lower limit, the focal distance of the fourth lens group is reduced with respect to the light beams, which were made to be approximately afocal before the third lens group, whereby the focal distance of the entire zoom lens system is reduced while the back focus also is reduced. Consequently, the sufficient angle of view can be secured, but the sufficient back focus cannot be obtained.

On the other hand, if f4/L is more than the upper limit, the focal distance of the fourth lens group is increased with respect to the light beams, which were made to be approximately afocal before the third lens group, whereby the back focus is increased. However, at the same time, the focal distance of the entire zoom lens system also is increased. Therefore, the sufficiently wide angle of view cannot be obtained.

Equation (3) represents the relationship between the lens full length and the angle of view. If fw/f4 is less than the lower limit, the focal distance of the fourth lens group is increased with respect to the focal distance at the wide-angle end, the distance from the fourth lens group to the image plane is increased with respect to the light beams, which were made to be approximately afocal before the third lens group. Consequently, the back focus is also increased, and thereby the full length is increased.

On the other hand, if fw/f4 is more than the upper limit, the focal distance of the fourth lens group is reduced with respect to the focal distance at the wide-angle end, the distance from the fourth lens group to the image plane is reduced with respect to the light beams, which were made to be approximately afocal before the third lens group. Consequently, the back focus also is reduced, and the full length of the zoom lens is reduced. However, the sufficient back focus cannot be obtained.

It is preferable that each range of the above-mentioned equations (1) to (3) is in the range represented by the following equations (4) to (6).

$$2.16 < L/CL1 < 2.17 \qquad \text{Equation (4)}$$

$$0.25 < f4/L < 0.30 \qquad \text{Equation (5)}$$

$$0.313 < fw/f4 < 0.376 \qquad \text{Equation (6)}$$

(Second Embodiment)

Figure 2:
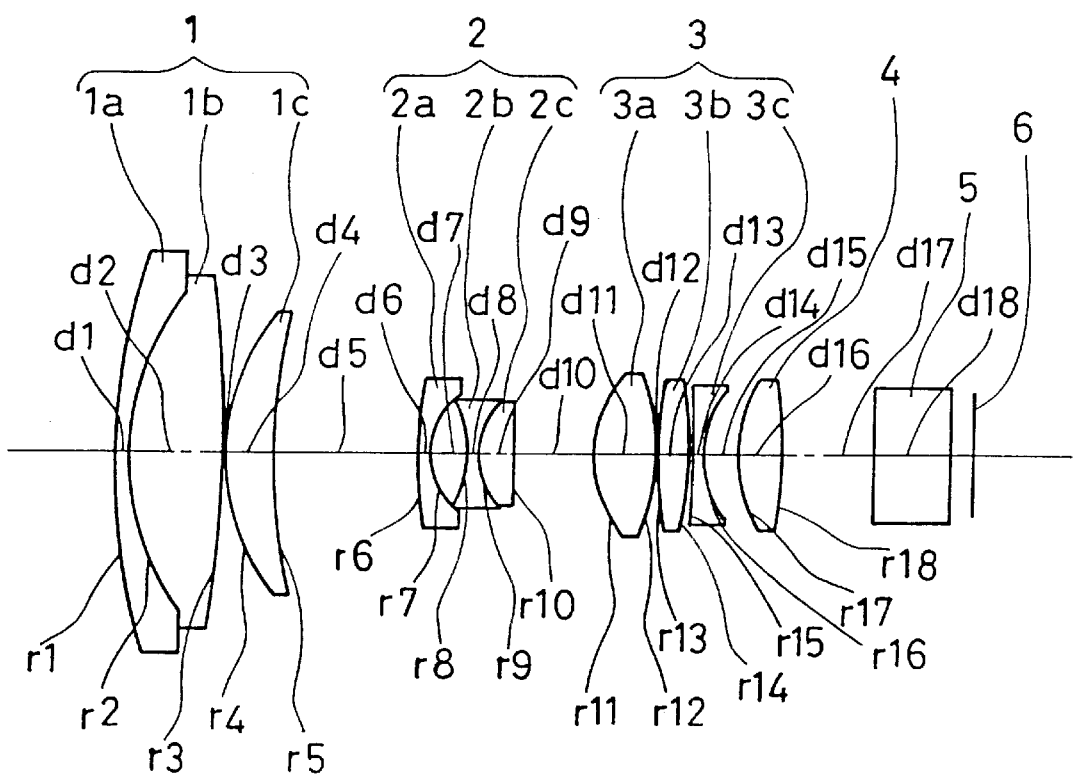
FIG. 2 is a view showing a configuration of a zoom lens according to a second embodiment of the present invention.

FIG. 2 is a view showing a structure of a zoom lens according to a second embodiment. The zoom lens shown in FIG. 2 includes, in the order of increasing distance from an object, a first lens group 1 having a positive refractive power and being fixed with respect to an image plane 6, a second lens group 2 having a negative refractive power and being in charge of a variable power action by being moved forward and backward on an optical axis, a third lens group 3 having a positive refractive power, being fixed with respect to the image plane and being in charge of a beam-condensing action, and a fourth lens group 4 having a positive refractive power and moving on the optical axis so that it keeps the image plane following up the movement of the second lens group and the object at a constant position with respect to a standard plane. In addition, between the fourth lens group 4 and the image plane 6, there is provided a plate 5 that is equivalent to an optical low-pass filter, a faceplate for an image pick-up device, or the like.

The first lens group 1 includes, in the order of an increasing distance from the object, a lens 1a having a negative refractive power, a lens 1b having a positive refractive power, and a meniscus lens 1c having a positive refractive power and having a convex surface facing the object side.

The second lens group 2 includes, in the order of an increasing distance from the object, a lens 2a having a negative refractive power, a biconcave lens 2b and a lens 2c having a positive refractive power. At least one surface of the above-mentioned lenses has an aspherical surface.

The third lens group 3 includes, in the order of an increasing distance from the object, a biconvex lens 3a having a positive refractive power and provided with aspherical surfaces on both surfaces, a lens 3b having a positive refractive power and having a convex surface facing the object side, and a lens 3c having a negative refractive power. The lens 3b having a positive refractive power and the lens 3c having a negative refractive power are separated from each other with a subtle air space. The refractive power of the biconvex lens 3a is set to be relatively stronger than the refractive power corresponding to the combined focal power of the connected lenses 3b and 3c. With such a configuration, although it is very compact, the sufficient back focus can be obtained and at the same time, the aberration can adequately be corrected.

The fourth lens group 4 includes one biconvex lens, and an aspherical surface is formed on the lens of the object side.

In FIG. 2, ri (i=1 to 18) represents a radius of curvature of each lens, and dk (k=1 to 18) represents a wall thickness of each lens or an air space between the lenses.

The zoom lens of this embodiment satisfies the relationships expressed by the following equations (7) to (9):

$$1.8 < L/CL1 < 2.3 \qquad \text{Equation (7)}$$

$$0.2 < f4/L < 0.35 \qquad \text{Equation (8)}$$

$$0.25 < fw/f4 < 0.4, \qquad \text{Equation (9)}$$

wherein CL1 is an effective aperture of the lens 1a positioned closest to the object in the first lens group, L is a distance from the lens 1a positioned closet to the object in the first lens group, f4 is a focal distance of the fourth lens group, and fw is a focal distance at a wide-angle end.

Equation (7) represents the relationship between the full length and the angle of view. If L/CL1 is less than the lower limit, in order to satisfy the conditions of the focal distance and the back principal point of the first lens group necessary to fabricate a compact zoom lens, the wall thickness of the first lens group for securing an effective aperture is increased, whereby it is difficult to obtain a sufficient aberration correction. Consequently, a zoom lens can be compact and have a sufficient angle of view, however, the sufficient aberration performance of an entire zoom lens system cannot be secured.

The conditions of the focal distance and the position of the back principal point for the first lens group necessary to fabricate a compact zoom lens are described. The focal distance is required to be determined in accordance with the focal distance of the second lens group, which was determined taking the Petzval sum into account, in order to fabricate a compact zoom lens. The back principal point is required to be determined so that the movement of the second lens group and the fourth lens group are minimized and the closest interval between the first lens group and the second lens group is sufficiently reduced.

On the other hand, if L/CL1 is more than the upper limit, the effective aperture of the lens 1a, which is positioned closest to the object, is small with respect to the limitation of the full length L for attaining the compact zoom lens. As a result, a sufficient angle of view cannot be obtained.

Equation (8) represents the relationship between a back focus and an angle of view. If f4/L is less than the lower limit, the focal distance of the fourth lens group is reduced with respect to the light beams, which were made to be approximately afocal before the third lens group, whereby the focal distance of the entire zoom lens system is reduced, while the back focus is also reduced. Consequently, the sufficient angle of view can be secured, but the sufficient back focus cannot be obtained.

On the other hand, if f4/L is more than the upper limit, the focal distance of the fourth lens group is increased with respect to the light beams, which were made to be approximately afocal before the third lens group, whereby the back focus is increased. However, at the same time, the focal distance of the entire zoom lens system is also increased. Therefore, the sufficiently wide angle of view cannot be obtained.

Equation (9) represents the relationship between the full length of the lens and the angle of view. If fw/f4 is less than the lower limit, the focal distance of the fourth lens group is increased with respect to the focal distance at the wide-angle end, and the distance from the fourth lens group to the image plane is increased with respect to the light beams, which were made to be approximately afocal before the third lens group. Consequently, the back focus is also increased, and thereby the full length is increased.

On the other hand, if fw/f4 is more than the upper limit, the focal distance of the fourth lens group is reduced with respect to the focal distance at the wide-angle end, and the distance from the fourth lens group to the image plane is reduced with respect to the light beams, which were made to be approximately afocal before the third lens group. Consequently, the back focus is also reduced, and therefore, the full length of the zoom lens is reduced, but the sufficient back focus cannot be obtained.

It is preferable that each range of the above-mentioned equations (7) to (9) is in the range represented by the following equations (10) to (12).

$$2.06 < L/CL1 < 2.25 \quad \text{Equation (10)}$$

$$0.25 < f4/L < 0.30 \quad \text{Equation (11)}$$

$$0.299 < fw/f4 < 0.376 \quad \text{Equation (12)}$$

(Third Embodiment)

Figure 33:
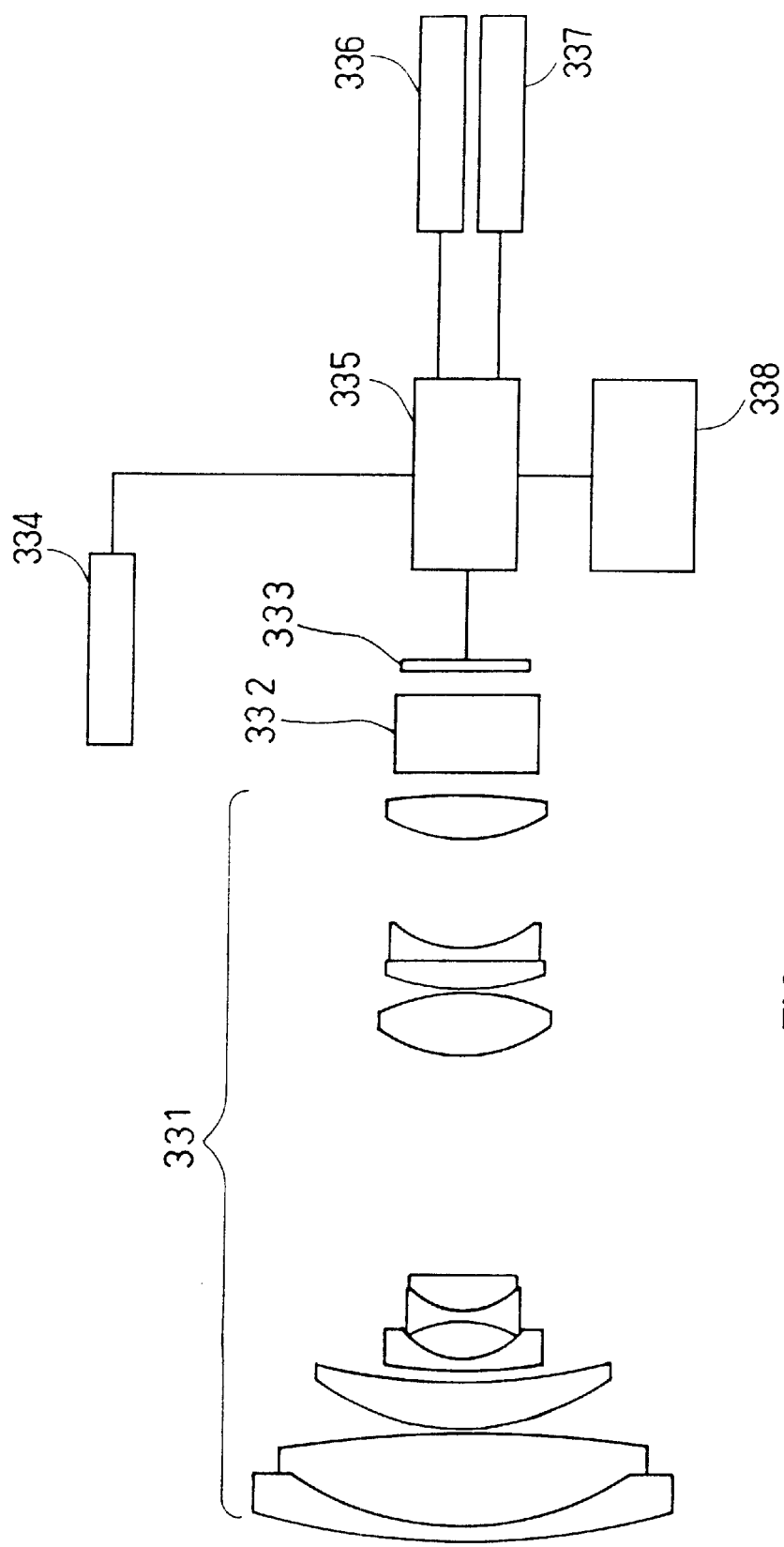
FIG. 33 is a view showing a configuration of a video camera using the zoom lens according to Example 1 of the present invention.

FIG. 33 is a view showing a structure of a video camera using the zoom lens of the present invention. The zoom lens 331 for the video camera shown in FIG. 33 is the zoom lens according to the above-mentioned first and second embodiments, and basically includes a low-pass filter 332, an image pick-up device 333, a microphone 334, a signal processing circuit 335, a view finder 336, a voice monitor 337 and a recording system 338, in addition to elements of the first and second embodiments. Furthermore, it is possible to add additional functions.

Figure 34:
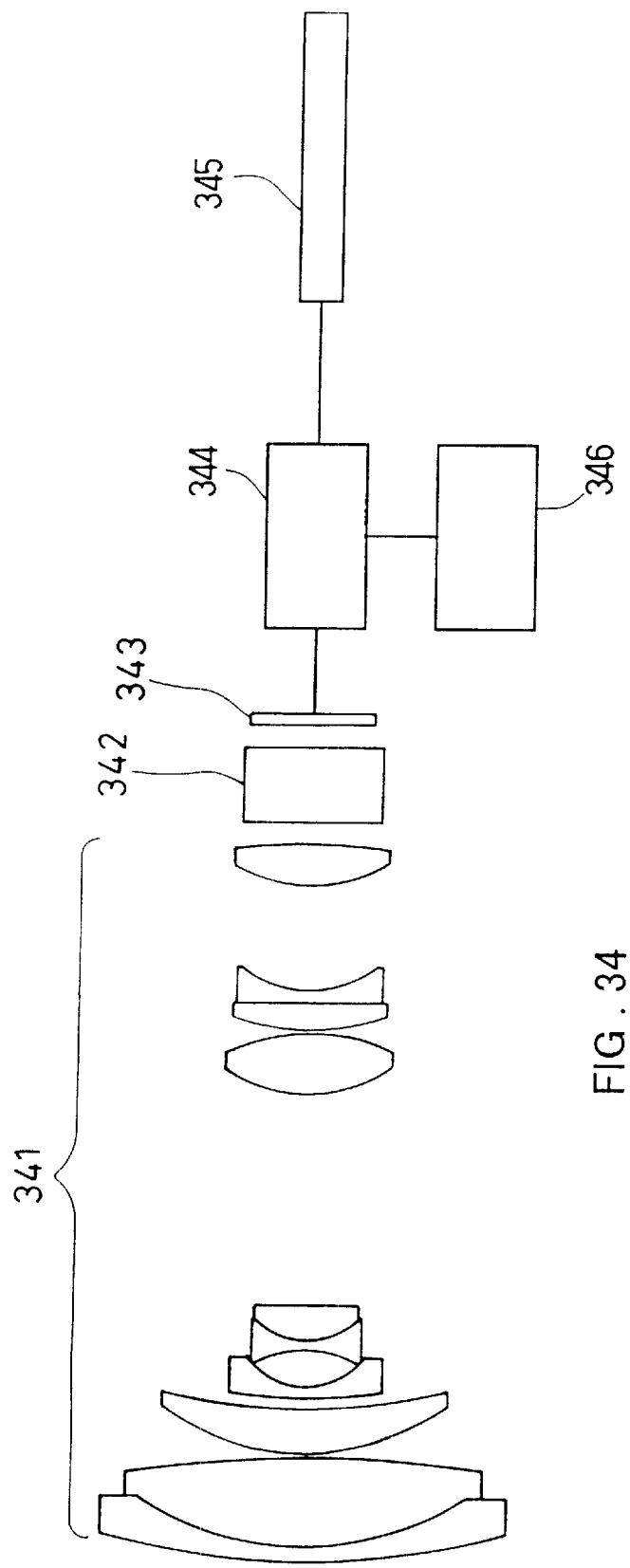
FIG. 34 is a view showing a configuration of an electronic still camera using the zoom lens according to Example 1 of the present invention.
Figure 35:
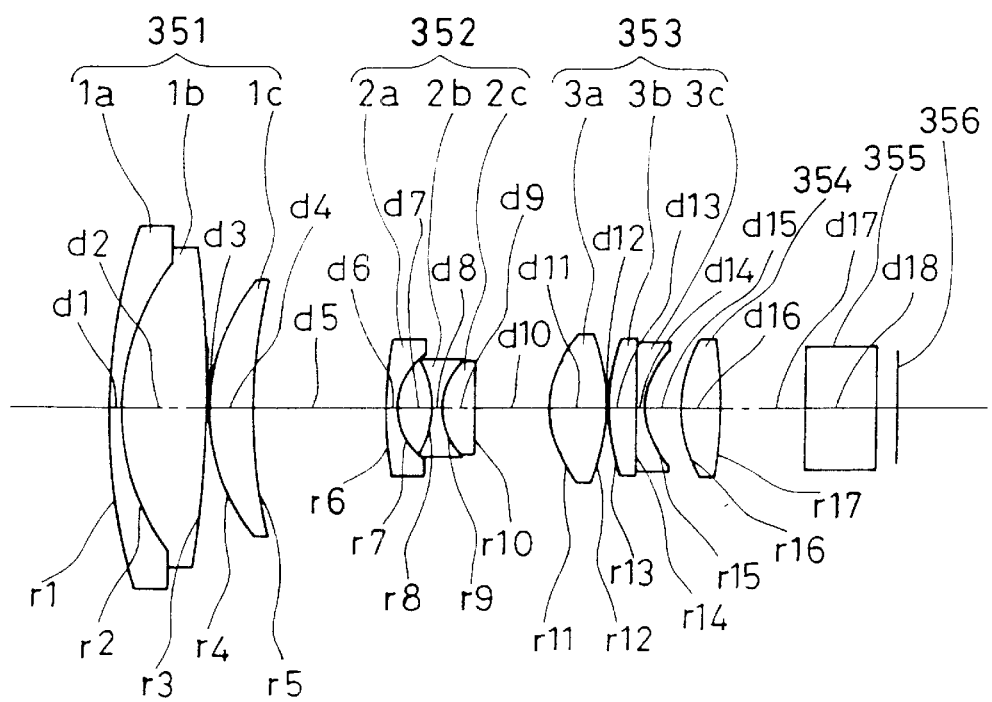
FIG. 35 is a view showing a configuration of one example of a zoom lens of a prior art.

FIG. 34 is a view showing a configuration of an electronic still camera using the zoom lens of the present invention. The zoom lens 341 for the electronics still camera shown in FIG.34 is the zoom lens according to the above-mentioned first and second embodiments, and basically includes a low-pass filter 342, an image pick-up device 343, a signal processing circuit 344, a liquid crystal monitor 345, and a recording system 346, in addition to a first and second embodiments. The recording system 346 also has a function of recording the imaging conditions, etc. in addition to the image of objects. Furthermore, it is possible to add additional functions.

EXAMPLE 1

Examples 1 to 5 relate to the above-mentioned first embodiment. In Example 1,

L/CL1=2.23 f/L=0.259 fw/f4=0.363 are satisfied. The specific values of Example 1 are shown in the following Table 1. In Table 1, r denotes a radius of curvature of a lens (mm), d denotes thickness of the lens or an air space between lenses (mm), n denotes the refractive index with respective to a line d of each lens, ν denotes an Abbe number with respect to the line d of each lens, and CL1 is an effective aperture (mm). (The same is true in the following Tables 4, 7, 10, 13, 16, 19, 22, 25, and 28.) Moreover, the effective diameter is set so that all of the light reaching the image height exist at both sides of a diaphragm with sandwiching the center of the diaphragm position. Herein, the light beams reaching the image height means all the light beams reaching to the image which are secured in a case where the distance between the front side lens 1a positioned the closest to the object in the zoom lens and the is in the range from 1 m to ∞.

TABLE 1

| Group | Face | R | D | N | ν | CL1 |
|---|---|---|---|---|---|---|
| 1 | 1 | 34.006 | 0.65 | 1.80518 | 25.4 | 18.0 |
|   | 2 | 13.288 | 4.30 | 1.60311 | 60.7 |   |
|   | 3 | −54.960 | 0.15 |   |   |   |
|   | 4 | 10.652 | 2.25 | 1.69680 | 55.5 |   |
|   | 5 | 29.371 | variable |   |   |   |
| 2 | 6 | 29.371 | 0.50 | 1.77250 | 49.6 |   |
|   | 7 | 3.495 | 1.75 |   |   |   |
|   | 8 | −5.092 | 0.55 | 1.66547 | 55.2 |   |
|   | 9 | 3.881 | 1.55 | 1.80518 | 25.4 |   |
|   | 10 | 122.447 | variable |   |   |   |
| 3 | 11 | 5.103 | 2.90 | 1.60602 | 57.7 |   |
|   | 12 | −8.667 | 0.10 |   |   |   |
|   | 13 | 10.616 | 1.40 | 1.60602 | 57.7 |   |
|   | 14 | −350.000 | 0.50 | 1.84666 | 23.9 |   |
|   | 15 | 4.477 | variable |   |   |   |
| 4 | 16 | 6.343 | 2.00 | 1.51450 | 63.1 |   |
|   | 17 | −29.639 | variable |   |   |   |
| 5 | 18 | ∞ | 3.60 | 1.51633 | 64.1 |   |
|   | 19 | ∞ |   |   |   |   |

Furthermore, the shape of the aspherical surface is defined by the following Equation (A). The same is true in the below-mentioned Examples 2 to 10.

$$Z = \frac{CY^2}{1 + (1 - (1+K)C^2Y^2)^{1/2}} + DY^4 + EY^6 + FY^8 + GY^{10} \quad \text{(Equation A)}$$

wherein Z is a distance from the top of the aspherical surface on the aspherical surface when the height from the optical axis is Y; Y is the height from the optical axis; C is the curvature (=1/r) at the top of the aspherical surface; K is a conic constant; and D, E, and F are aspheric coefficients. Moreover, the surfaces 8, 11, 12 and 16 are aspheric surfaces. Their aspheric coefficients are shown in the following Table 2.

TABLE 2

|   | Surface | | | |
|---|---|---|---|---|
|   | 8 | 11 | 12 | 16 |
| K | 5.66822 × 10⁻² | −9.38829 × 10⁻¹ | −5.23097 | 9.62758 × 10⁻¹ |
| D | 1.16326 × 10⁻⁵ | −5.27288 × 10⁻⁴ | −1.07785 × 10⁻⁴ | −7.43726 × 10⁻⁴ |
| E | −1.41314 × 10⁻⁴ | −1.81524 × 10⁻⁶ | −3.52919 × 10⁻⁶ | −4.91-31 × 10⁻⁵ |

Next, one example of the air space that is variable by zooming is shown in the following Table 3. The values shown in Table 3 are those of the ∞ object point. Furthermore, the standard position is a zoom position where the magnification of the second lens group 2 is 1. f, F/NO and ω are the focal distance, F number, and half incidence angle of view, at the wide-angle end, the standard position, and the telephoto end, respectively. These explanations about Table 3 are applied equally to Tables 6, 9, 12, 15, 18, 21, 24, 27 and 30.

TABLE 3

|   | Wide-angle end | Standard position | Telephoto end |
|---|---|---|---|
| F | 3.755 | 16.309 | 35.184 |
| F/NO | 1.86 | 2.32 | 2.84 |
| 2ω (°) | 61.10 | 14.47 | 6.66 |

TABLE 3-continued

| | Wide-angle end | Standard position | Telephoto end |
|---|---|---|---|
| d5 | 0.500 | 6.822 | 8.888 |
| d10 | 9.187 | 2.865 | 0.799 |
| d15 | 5.093 | 1.798 | 5.093 |
| d17 | 1.000 | 4.295 | 1.000 |

Figure 3:
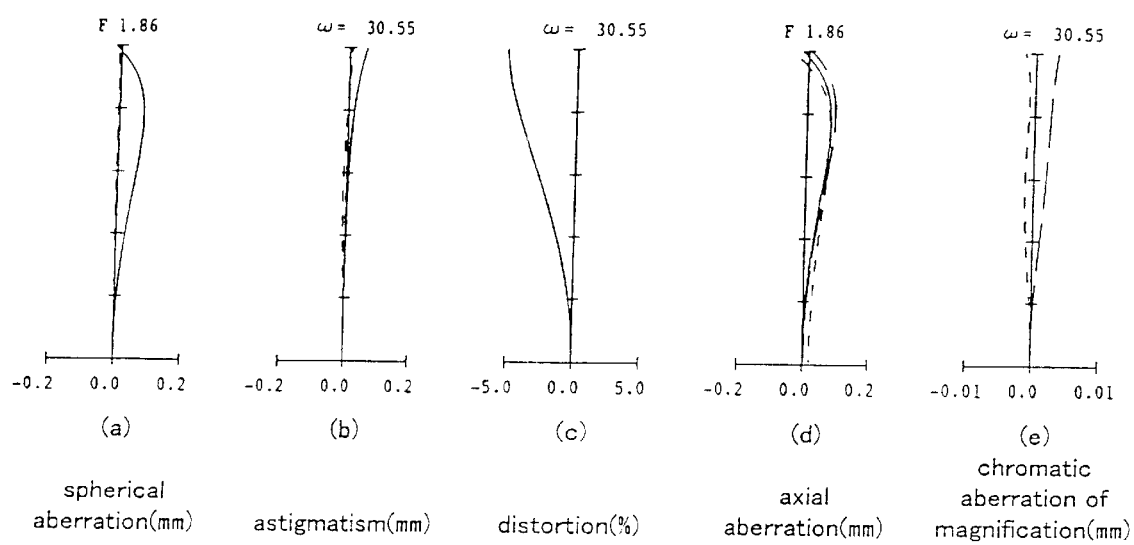
FIG. 3 is a graph showing the aberration performance at a wide-angle end of a zoom lens according to Example 1 of the present invention.
Figure 4:
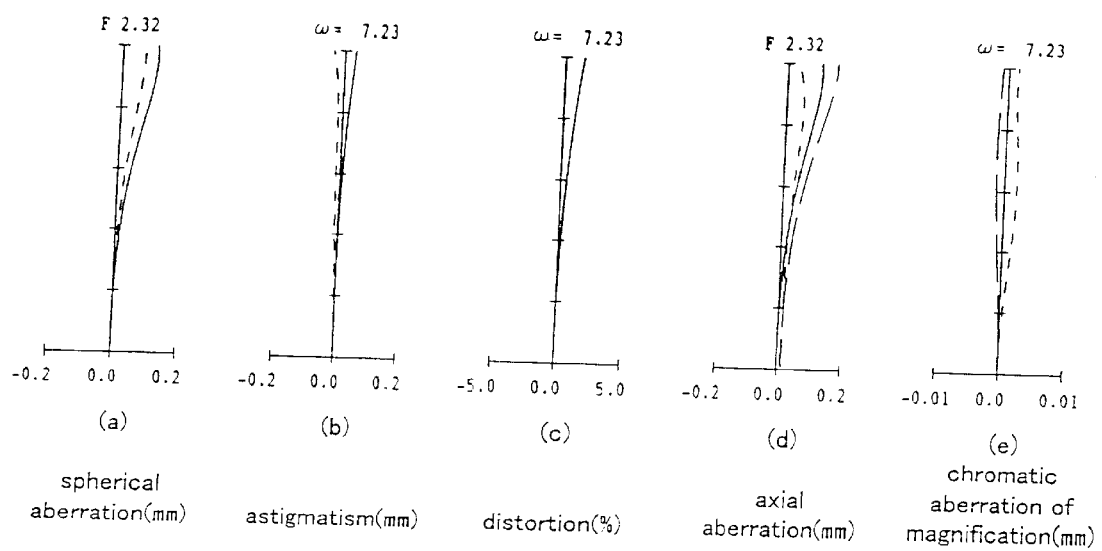
FIG. 4 is a graph showing the aberration performance at the standard position of the zoom lens according to Example 1 of the present invention.
Figure 5:
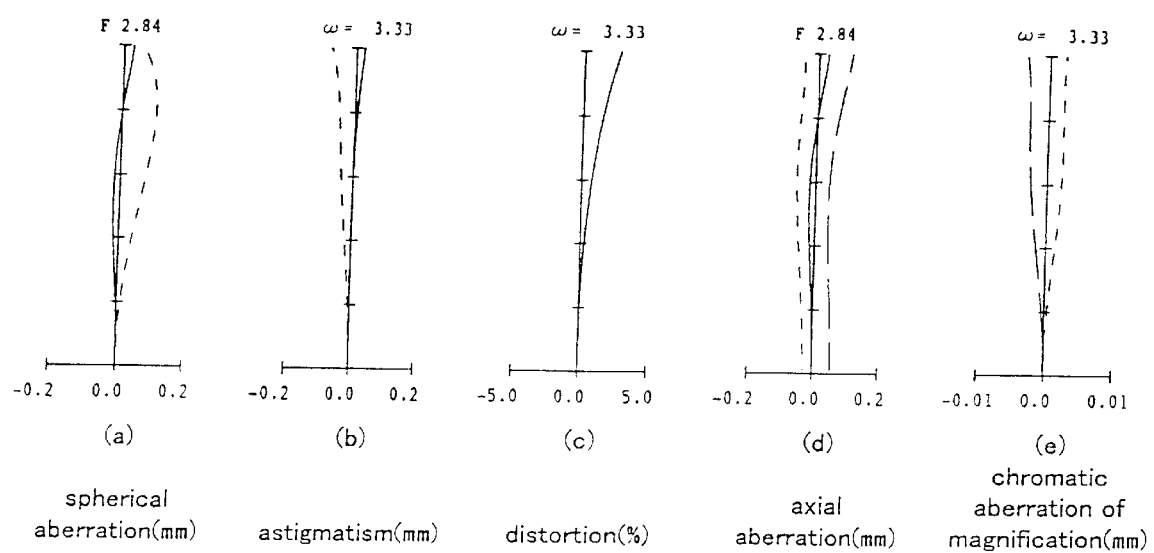
FIG. 5 is a graph showing the aberration at a telephoto end of the zoom lens according to Example 1 of the present invention.

FIGS. 3 to 5 show the aberration performance of the aspheric zoom lens shown in Table 1 according to Example 1. In each figure, (a) shows aspherical aberration, where a solid line represents a value for a line d, and a dotted line represents the sine condition. Furthermore, (b) shows an astigmatism, where a solid line represents a curvature of the sagittal image plane, and a dotted line represents a curvature of the meridional image plane. Furthermore, (c) shows a distortion aberration, (d) is a graph showing the axial aberration. In these figures, a solid line represents the values for a line d, dotted line for a line F, and broken line for a line C. Furthermore, (e) shows a chromatic aberration of magnification and in this figure, a dotted line represents the values for a line F, and broken line for a line C. These explanations about (a) to (e) are applied equally to FIGS. 6 to 32.

FIGS. 3 to 5 show that the zoom lens according to Embodiment 1 has an excellent optical performance.

EXAMPLE 2

In Example 2,

L/CL1=2.277 f4 L=0.276 fw/f4=0.342 are satisfied. The specific values of Example 2 are shown in the following Table 4.

TABLE 4

| Group | Face | r | d | n | ν | CL1 |
|---|---|---|---|---|---|---|
| 1 | 1 | 33.925 | 0.65 | 1.80518 | 25.5 | 18.0 |
| | 2 | 13.288 | 4.30 | 1.60311 | 60.7 | |
| | 3 | −54.773 | 0.15 | | | |
| | 4 | 10.670 | 2.25 | 1.69680 | 55.5 | |
| | 5 | 29.630 | variable | | | |
| 2 | 6 | 29.630 | 0.50 | 1.77250 | 49.6 | |
| | 7 | 3.425 | 1.75 | | | |
| | 8 | −4.944 | 0.55 | 1.66547 | 55.2 | |
| | 9 | 3.893 | 1.55 | 1.80518 | 25.4 | |
| | 10 | 2045.699 | variable | | | |
| 3 | 11 | 5.194 | 2.90 | 1.60602 | 57.7 | |
| | 12 | −8.915 | 0.10 | | | |
| | 13 | 10.666 | 1.40 | 1.60602 | 64.1 | |
| | 14 | 67.732 | 0.50 | 1.84666 | 23.9 | |
| | 15 | 4.616 | variable | | | |
| 4 | 16 | 6.474 | 2.00 | 1.51450 | 63.1 | |
| | 17 | −40.102 | variable | | | |
| 5 | 18 | ∞ | 3.60 | 1.51633 | 64.1 | |
| | 19 | ∞ | | | | |

The surfaces 8, 11, 12, and 16 are aspherical surfaces. Their aspheric coefficients are shown in the following Table 5.

TABLE 5

| | Surface | | | |
|---|---|---|---|---|
| | 8 | 11 | 12 | 16 |
| K | $5.66822 \times 10^{-1}$ | $-9.38829 \times 10^{-1}$ | $-5.23097$ | $9.62758 \times 10^{-1}$ |
| D | $1.16326 \times 10^{-5}$ | $-5.26277 \times 10^{-4}$ | $-1.07785 \times 10^{-4}$ | $-7.43726 \times 10^{-4}$ |
| E | $-1.41314 \times 10^{-5}$ | $-1.81524 \times 10^{-6}$ | $-3.52919 \times 10^{-6}$ | $-4.91031 \times 10^{-5}$ |

Next, one example of the air space that is variable by zooming is shown in the following Table 6.

TABLE 6

| | Wide-angle end | Standard position | Telephoto end |
|---|---|---|---|
| f | 3.755 | 16.331 | 35.240 |
| F/NO | 1.87 | 2.34 | 2.86 |
| 2ω (°) | 60.91 | 12.49 | 6.63 |
| d5 | 0.500 | 6.827 | 8.892 |
| d10 | 9.187 | 2.860 | 0.795 |
| d15 | 5.093 | 1.680 | 5.093 |
| d17 | 1.000 | 4.413 | 1.000 |

Figure 6:
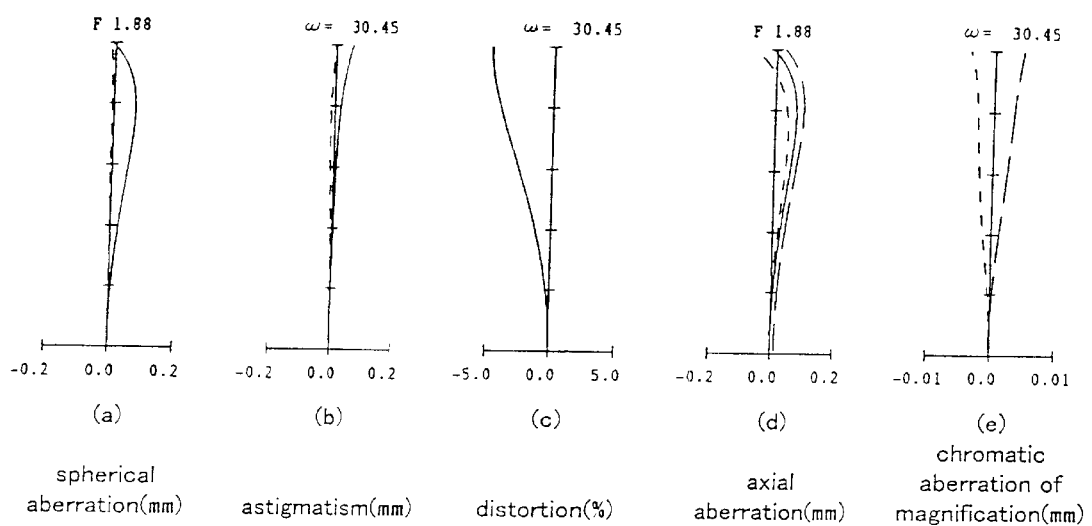
FIG. 6 is a graph showing the aberration performance at a wide-angle end of a zoom lens according to Example 2 of the present invention.
Figure 7:
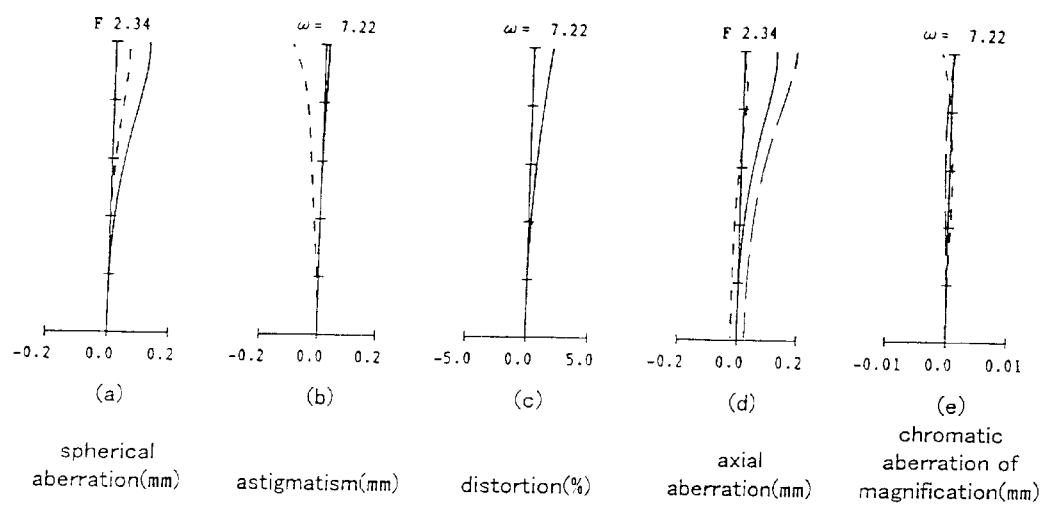
FIG. 7 is a graph showing the aberration performance at the standard position of the zoom lens according to Example 2 of the present invention.
Figure 8:
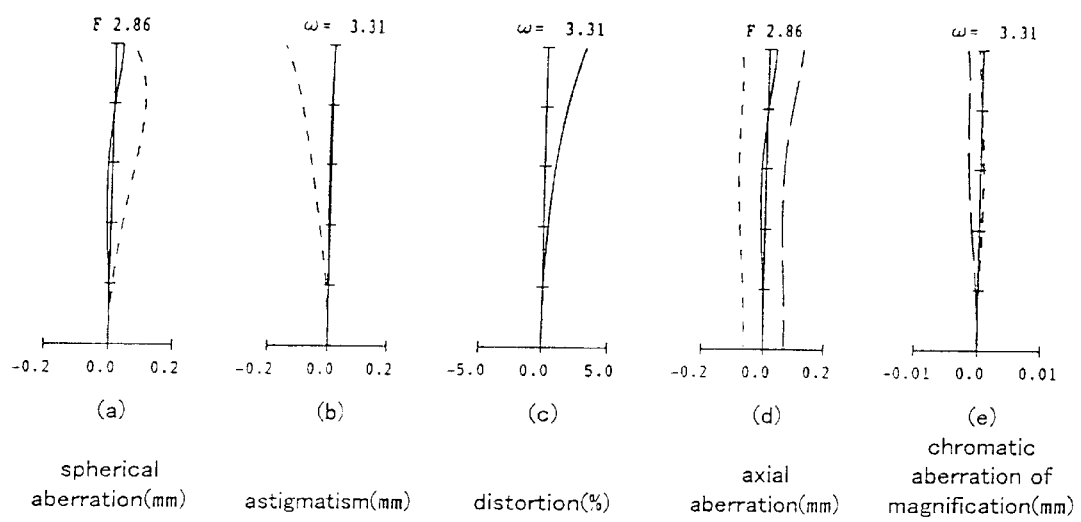
FIG. 8 is a graph showing the aberration at a telephoto end of the zoom lens according to Example 2 of the present invention.

FIGS. 6 to 8 show the aberration performance of the aspheric zoom lens shown in Table 1 according to Example 2. Each figure shows that the zoom lens according to Example 2 has an excellent optical performance.

EXAMPLE 3

In Example 3,

L/CL1=2.277 f4/L=0.276 fw/f4=0.341 are satisfied. The specific values of Example 3 are shown in the following Table 7.

TABLE 7

| Group | Surface | r | d | n | ν | CL1 |
|---|---|---|---|---|---|---|
| 1 | 1 | 33.925 | 0.65 | 1.80518 | 25.5 | 18.0 |
| | 2 | 13.288 | 4.30 | 1.60311 | 60.7 | |
| | 3 | −54.773 | 0.15 | | | |
| | 4 | 10.669 | 2.25 | 1.69680 | 55.5 | |
| | 5 | 29.630 | variable | | | |
| 2 | 6 | 29.630 | 0.50 | 1.77250 | 49.6 | |
| | 7 | 3.429 | 1.75 | | | |
| | 8 | −4.935 | 0.55 | 1.66547 | 55.2 | |
| | 9 | 3.946 | 1.55 | 1.80518 | 25.4 | |
| | 10 | ∞ | variable | | | |
| 3 | 11 | 5.198 | 2.90 | 1.60602 | 57.7 | |
| | 12 | −8.900 | 0.10 | | | |
| | 13 | 10.662 | 1.40 | 1.60602 | 57.7 | |
| | 14 | 65.983 | 0.50 | 1.84666 | 23.9 | |
| | 15 | 4.615 | variable | | | |
| 4 | 16 | 6.486 | 2.00 | 1.51450 | 63.1 | |
| | 17 | −39.758 | variable | | | |
| 5 | 18 | ∞ | 3.60 | 1.51633 | 64.1 | |
| | 19 | ∞ | | | | |

The surfaces 8, 11, 12 and 16 are aspherical surfaces. Their aspheric coefficients are shown in the following Table 8.

TABLE 8

| Surface | 8 | 11 | 12 | 16 |
|---|---|---|---|---|
| K | $5.55383 \times 10^{-1}$ | $-9.01308 \times 10^{-1}$ | $-5.14328$ | $1.28396$ |
| D | $5.47597 \times 10^{-4}$ | $-4.75635 \times 10^{-4}$ | $3.62714 \times 10^{-5}$ | $-6.64648 \times 10^{-4}$ |
| E | $-9.61693 \times 10^{-5}$ | $9.00544 \times 10^{-7}$ | $-4.09398 \times 10^{-6}$ | $-9.02789 \times 10^{-5}$ |

Next, one example of the air space that is variable by zooming is shown in the following Table 9.

TABLE 9

| | Wide-angle end | Standard position | Telephoto end |
|---|---|---|---|
| f | 3.755 | 16.329 | 35.244 |
| F/NO | 1.88 | 2.34 | 2.85 |
| 2ω (°) | 60.65 | 14.25 | 6.62 |
| d5 | 0.500 | 6.827 | 8.892 |
| d10 | 9.187 | 2.860 | 0.795 |
| d15 | 5.093 | 1.679 | 5.093 |
| d17 | 1.000 | 4.414 | 1.000 |

Figure 9:
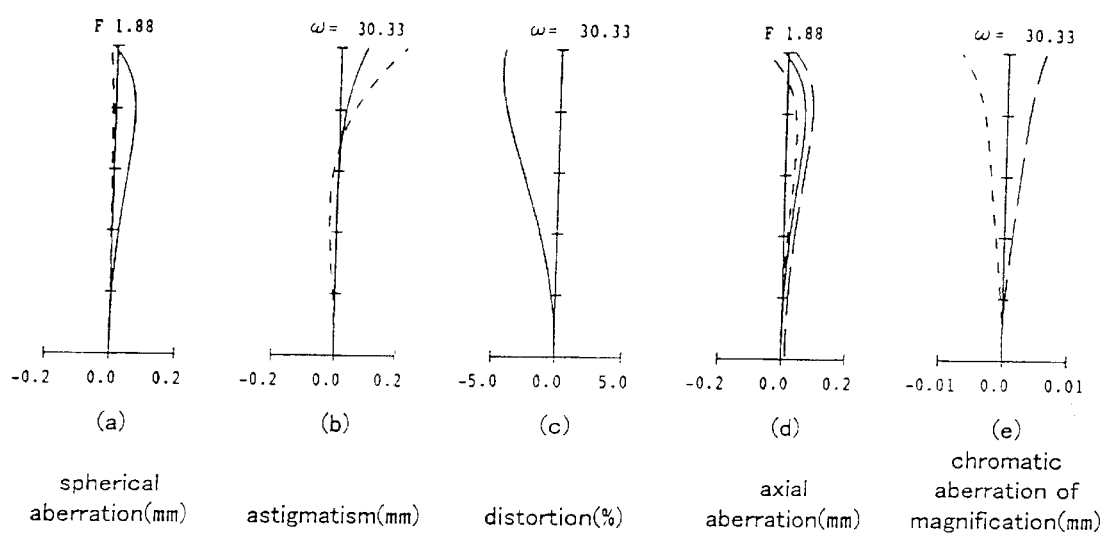
FIG. 9 is a graph showing the aberration performance at a wide-angle end of a zoom lens according to Example 3 of the present invention.
Figure 10:
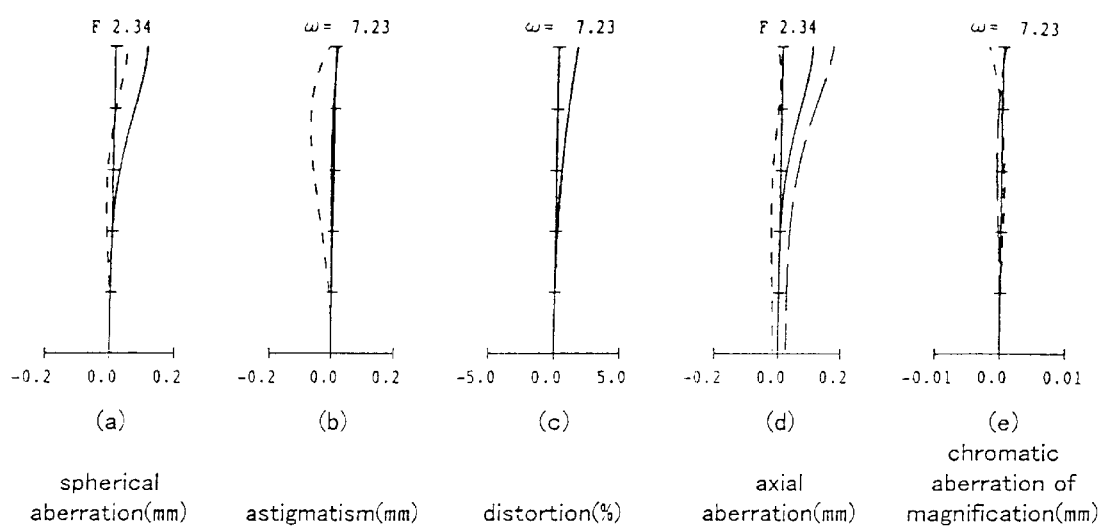
FIG. 10 is a graph showing the aberration performance at the standard position of the zoom lens according to Example 3 of the present invention.
Figure 11:
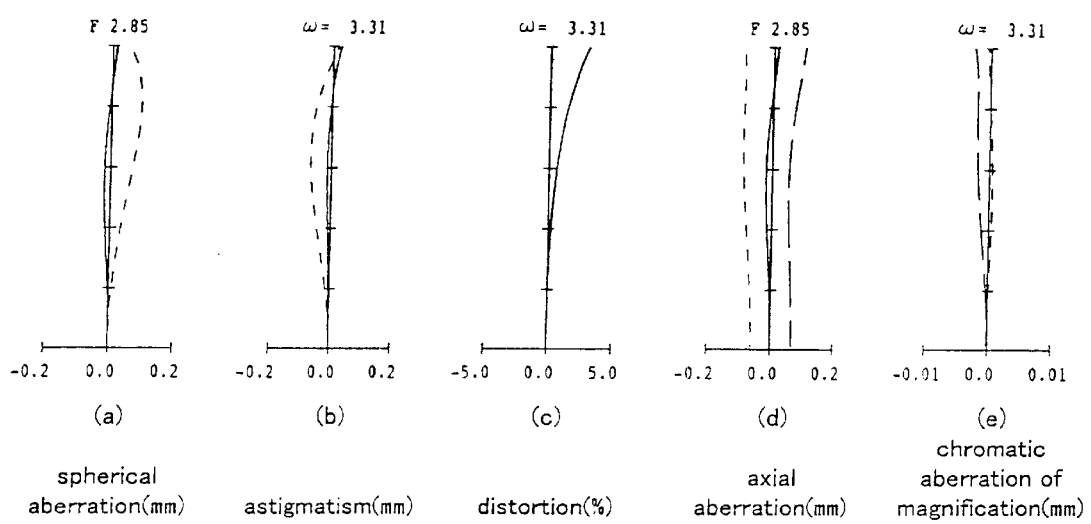
FIG. 11 is a graph showing the aberration at a telephoto end of the zoom lens according to Example 3 of the present invention.

FIGS. 9 to 11 show the aberration performance of the aspheric zoom lens shown in Table 7 according to Example 3. Each figure shows that the zoom lens according to Example 3 has an excellent optical performance.

EXAMPLE 4

In Example 4,

L/CL1=2.166
f4/L=0.250
fw/f4=0.376 are satisfied. The specific values of Example 4 are shown in the following Table 10.

TABLE 10

| Group | Surface | r | d | n | ν | CL1 |
|---|---|---|---|---|---|---|
| 1 | 1 | 35.565 | 0.65 | 1.80518 | 25.4 | 18.0 |
| | 2 | 13.043 | 4.30 | 1.60311 | 60.7 | |
| | 3 | −54.730 | 0.15 | | | |
| | 4 | 10.689 | 2.55 | 1.69680 | 55.5 | |
| | 5 | 31.526 | variable | | | |
| 2 | 6 | 31.526 | 0.50 | 1.77250 | 49.6 | |
| | 7 | 3.677 | 1.75 | | | |
| | 8 | −5.286 | 0.55 | 1.66547 | 55.2 | |
| | 9 | 3.886 | 1.55 | 1.80518 | 25.4 | |
| | 10 | 47.895 | variable | | | |
| 3 | 11 | 5.090 | 2.90 | 1.60602 | 57.7 | |
| | 12 | −8.471 | 0.10 | | | |
| | 13 | 9.488 | 1.40 | 1.60602 | 57.7 | |
| | 14 | 67.732 | 0.50 | 1.84666 | 23.9 | |
| | 15 | 4.047 | variable | | | |
| 4 | 16 | 5.837 | 2.00 | 1.51450 | 63.1 | |
| | 17 | −37.642 | variable | | | |
| 5 | 18 | ∞ | 3.60 | 1.51633 | 64.1 | |
| | 19 | ∞ | | | | |

The surfaces 8, 11, 12 and 16 are aspherical surfaces. Their aspheric coefficients are shown in the following Table 11.

TABLE 11

| Surface | 8 | 11 | 12 | 16 |
|---|---|---|---|---|
| K | $5.66822 \times 10^{-2}$ | $-9.38829 \times 10^{-1}$ | $-5.23097$ | $9.62758 \times 10^{-1}$ |
| D | $1.16326 \times 10^{-5}$ | $-5.26227 \times 10^{-4}$ | $-1.07785 \times 10^{-4}$ | $-7.43726 \times 10^{-4}$ |
| E | $-1.41314 \times 10^{-4}$ | $-1.81524 \times 10^{-6}$ | $-3.52919 \times 10^{-6}$ | $-4.91031 \times 10^{-5}$ |

Next, one example of the air space that is variable by zooming is shown in the following Table 12.

TABLE 12

| | Wide-angle end | Standard position | Telephoto end |
|---|---|---|---|
| f | 3.753 | 16.535 | 35.369 |
| F/NO | 1.86 | 2.32 | 2.83 |
| 2ω (°) | 62.63 | 14.33 | 6.72 |
| d5 | 0.500 | 6.838 | 8.903 |
| d10 | 9.187 | 2.849 | 0.785 |
| d15 | 5.093 | 1.785 | 5.063 |
| d17 | 1.000 | 4.308 | 1.000 |

Figure 12:
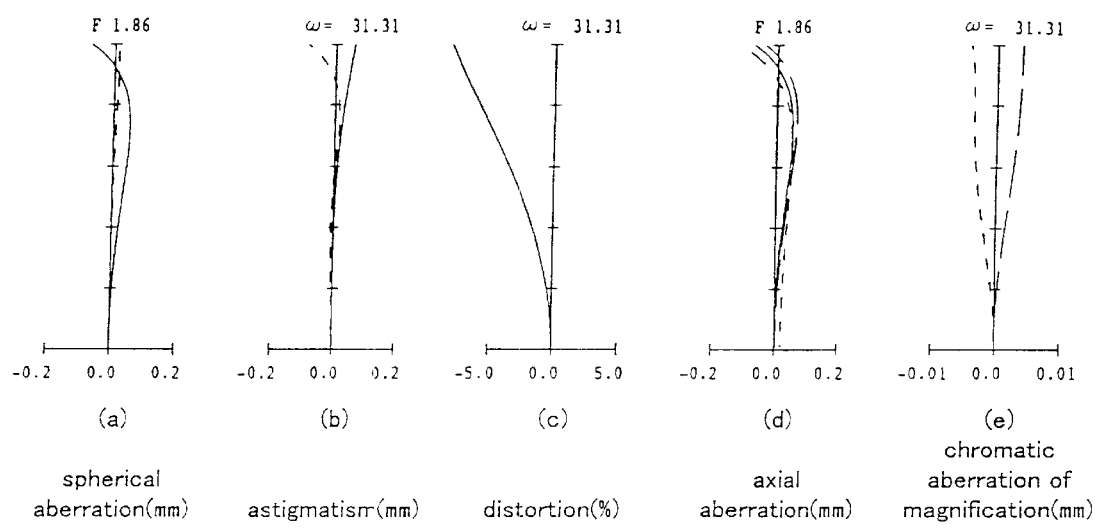
FIG. 12 is a graph showing the aberration performance at a wide-angle end of a zoom lens according to Example 4 of the present invention.
Figure 13:
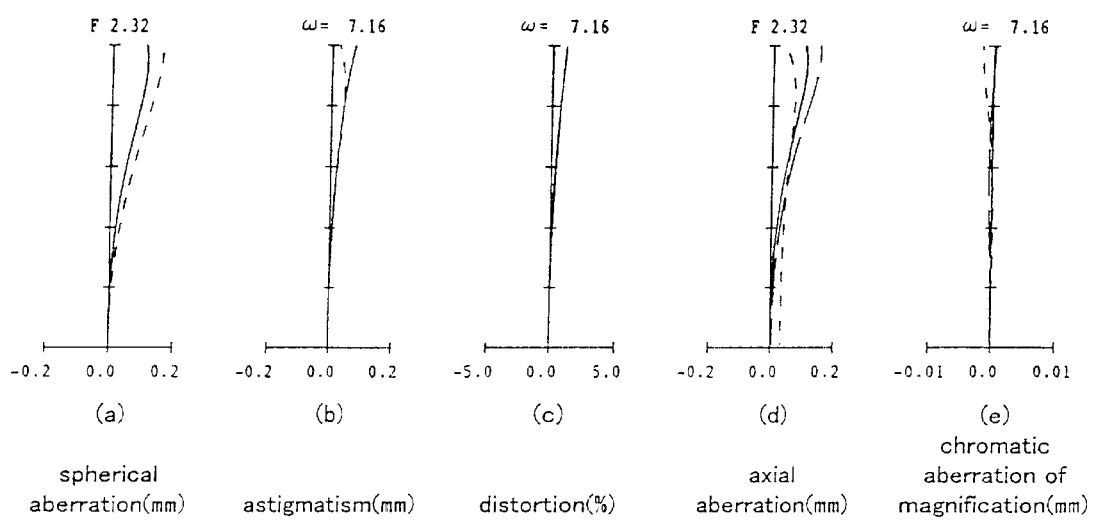
FIG. 13 is a graph showing the aberration performance at the standard position of the zoom lens according to Example 4 of the present invention.
Figure 14:
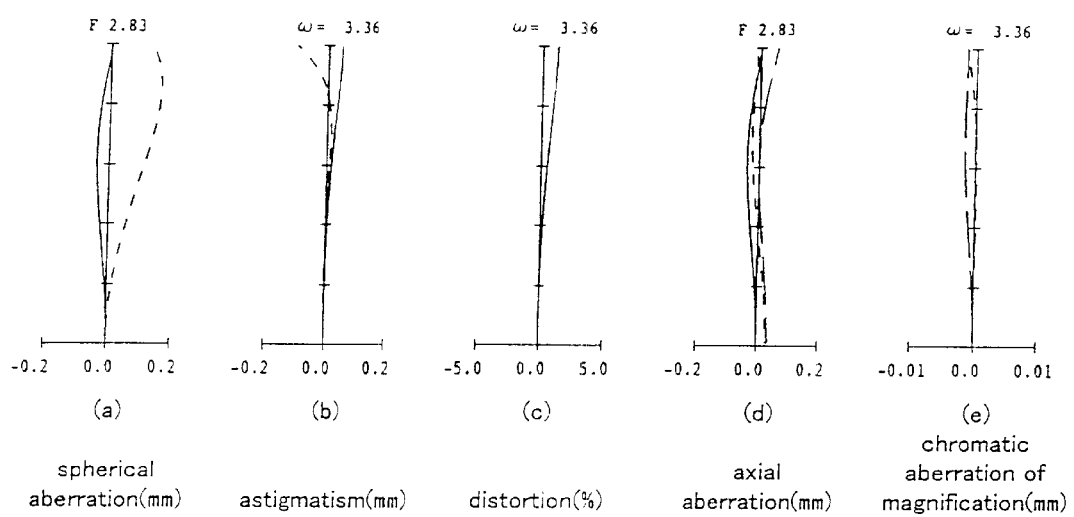
FIG. 14 is a graph showing the aberration at a telephoto end of the zoom lens according to Example 4 of the present invention.

FIGS. 12 to 14 show the aberration performance of the aspheric zoom lens shown in Table 10 according to Example 4. Each figure shows that the zoom lens according to Example 4 has an excellent optical performance.

EXAMPLE 5

In Example 5,

L/CL1=2.239
f4/L=0.301
fw/f4=0.313 are satisfied. The specific values of Example 5 are shown in the following Table 13.

TABLE 13

| Group | Surface | r | d | n | ν | CL1 |
|---|---|---|---|---|---|---|
| 1 | 1 | 33.964 | 0.65 | 1.80518 | 25.4 | 18.0 |
| | 2 | 13.288 | 4.30 | 1.60311 | 60.7 | |
| | 3 | −55.675 | 0.15 | | | |
| | 4 | 10.628 | 2.25 | 1.69680 | 55.5 | |
| | 5 | 29.325 | variable | | | |
| 2 | 6 | 29.325 | 0.50 | 1.77250 | 49.6 | |
| | 7 | 3.480 | 1.70 | | | |
| | 8 | −5.161 | 0.55 | 1.66547 | 55.2 | |
| | 9 | 3.881 | 1.55 | 1.80518 | 25.4 | |
| | 10 | 110.411 | variable | | | |
| 3 | 11 | 5.465 | 2.90 | 1.60602 | 57.7 | |
| | 12 | −8.743 | 0.10 | | | |
| | 13 | 12.309 | 1.40 | 1.60602 | 57.7 | |
| | 14 | −350.000 | 0.50 | 1.84666 | 23.9 | |
| | 15 | 5.504 | variable | | | |
| 4 | 16 | 6.705 | 2.00 | 1.51450 | 63.1 | |
| | 17 | −70.043 | variable | | | |
| 5 | 18 | ∞ | 3.60 | 1.51633 | 64.1 | |
| | 19 | ∞ | | | | |

The surfaces 8, 11, 12 and 16 are aspherical surfaces. Their aspheric coefficients are shown in the following Table 14.

TABLE 14

| | Surface | | | |
|---|---|---|---|---|
| | 8 | 11 | 12 | 16 |
| K | 4.37945 × $10^{-2}$ | −9.89145 × $10^{-1}$ | −3.84511 | 3.07495 × $10^{-1}$ |
| D | 3.38447 × $10^{-5}$ | −6.10688 × $10^{-4}$ | −7.13442 × $10^{-5}$ | −4.39400 × $10^{-4}$ |
| E | −1.42403 × $10^{-4}$ | 8.76101 × $10^{-6}$ | −2.74903 × $10^{-6}$ | −3.24801 × $10^{-5}$ |

Next, one example of the air space that is variable by zooming is shown in the following Table 15.

TABLE 15

| | Wide-angle end | Standard position | Telephoto end |
|---|---|---|---|
| f | 3.756 | 16.322 | 35.177 |
| F/NO | 1.87 | 2.32 | 2.83 |
| 2ω (°) | 61.19 | 14.62 | 6.67 |
| d5 | 0.500 | 6.821 | 8.887 |
| d10 | 9.187 | 2.866 | 0.800 |
| d15 | 5.093 | 1.568 | 5.093 |
| d17 | 1.000 | 4.525 | 1.000 |

Figure 15:
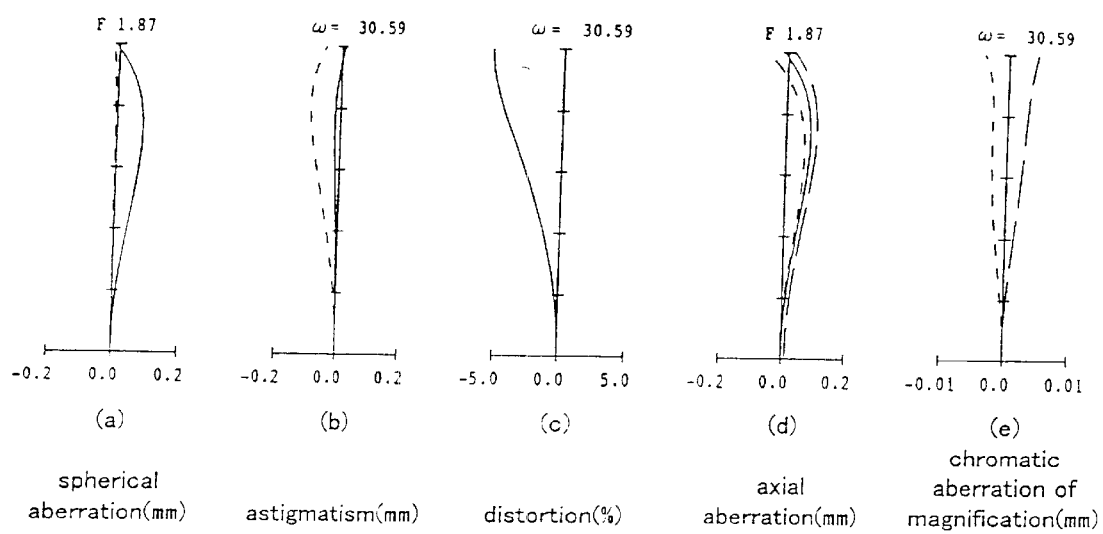
FIG. 15 is a graph showing the aberration performance at a wide-angle end of a zoom lens according to Example 5 of the present invention.
Figure 16:
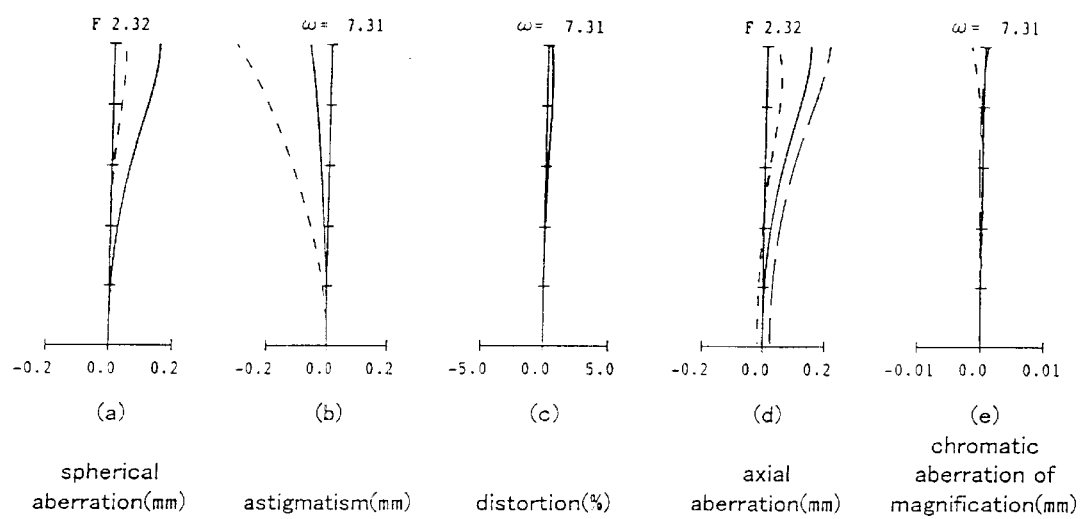
FIG. 16 is a graph showing the aberration performance at the standard position of the zoom lens according to Example 5 of the present invention.
Figure 17:
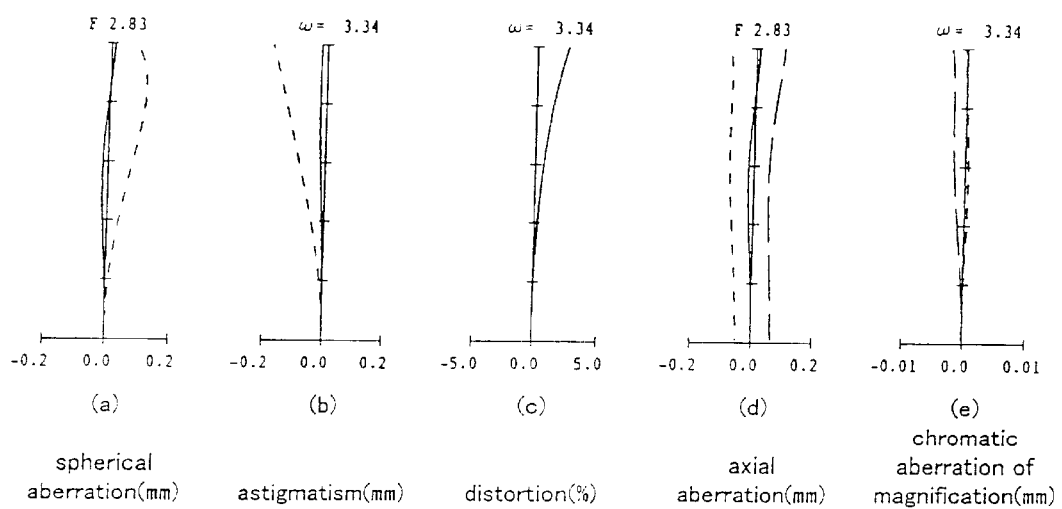
FIG. 17 is a graph showing the aberration at a telephoto end of the zoom lens according to Example 5 of the present invention.

FIGS. 15 to 17 show the aberration performance of the aspheric zoom lens shown in the Table 13 according to Example 5. Each figure shows that the zoom lens according to Example 5 has an excellent optical performance.

EXAMPLE 6

In Examples 6 to 10,

L/CL1=2.238 f4/L=0.258 fw/f4=0.363 are satisfied. The specific values of Example 6 are shown in the following Table 16.

TABLE 16

| Group | Surface | r | d | n | ν | CL1 |
|---|---|---|---|---|---|---|
| 1 | 1 | 34.006 | 0.65 | 1.80518 | 25.4 | 18.0 |
| | 2 | 13.288 | 4.31 | 1.60311 | 60.7 | |
| | 3 | −54.960 | 0.15 | | | |
| | 4 | 10.652 | 2.55 | 1.69680 | 55.5 | |
| | 5 | 29.371 | variable | | | |
| 2 | 6 | 29.371 | 0.50 | 1.77250 | 49.6 | |
| | 7 | 3.498 | 1.75 | | | |
| | 8 | −5.069 | 0.55 | 1.66547 | 55.2 | |
| | 9 | 3.903 | 1.55 | 1.80518 | 25.4 | |
| | 10 | 132.168 | variable | | | |
| 3 | 11 | 5.158 | 2.90 | 1.60602 | 57.7 | |
| | 12 | −8.496 | 0.10 | | | |
| | 13 | 20.423 | 1.40 | 1.60602 | 57.7 | |
| | 14 | −18.477 | 0.15 | | | |
| | 15 | −60.039 | 0.50 | 1.84666 | 23.9 | |
| | 16 | 4.807 | variable | | | |
| 4 | 17 | 6.345 | 2.00 | 1.51450 | 63.1 | |
| | 18 | −29.580 | variable | | | |
| 5 | 19 | ∞ | 3.60 | 1.51633 | 64.1 | |
| | 20 | ∞ | | | | |

The surfaces 8, 11, 12 and 16 are aspherical surfaces. Their aspheric coefficients shown in the following Table 17.

TABLE 17

| | Surface | | | |
|---|---|---|---|---|
| | 8 | 11 | 12 | 17 |
| K | 2.63426 × $10^{-1}$ | −9.37764 × $10^{-1}$ | −5.45748 | 9.41037 × $10^{-1}$ |
| D | 2.43103 × $10^{-4}$ | −6.16724 × $10^{-4}$ | −4.81837 × $10^{-6}$ | −7.34661 × $10^{-4}$ |
| E | −1.23814 × $10^{-4}$ | −3.27446 × $10^{-6}$ | −6.19896 × $10^{-6}$ | −4.83295 × $10^{-5}$ |

Next, one example of the air space that is variable by zooming is shown in the following Table 18.

TABLE 18

| | Wide-angle end | Standard position | Telephoto end |
|---|---|---|---|
| f | 3.755 | 16.219 | 35.183 |
| F/NO | 1.87 | 2.30 | 2.84 |
| 2ω (°) | 61.13 | 14.56 | 6.65 |
| d5 | 0.500 | 6.822 | 8.888 |
| d10 | 9.187 | 2.865 | 0.799 |
| d15 | 5.093 | 1.814 | 5.093 |
| d18 | 1.000 | 4.280 | 1.000 |

Figure 18:
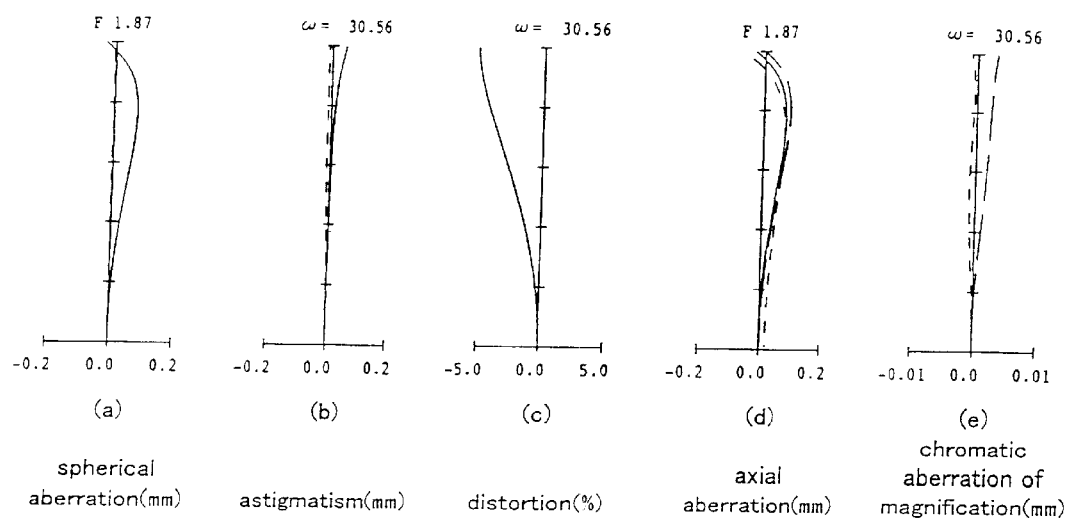
FIG. 18 is a graph showing the aberration performance at a wide-angle end of a zoom lens according to Example 6 of the present invention.
Figure 19:
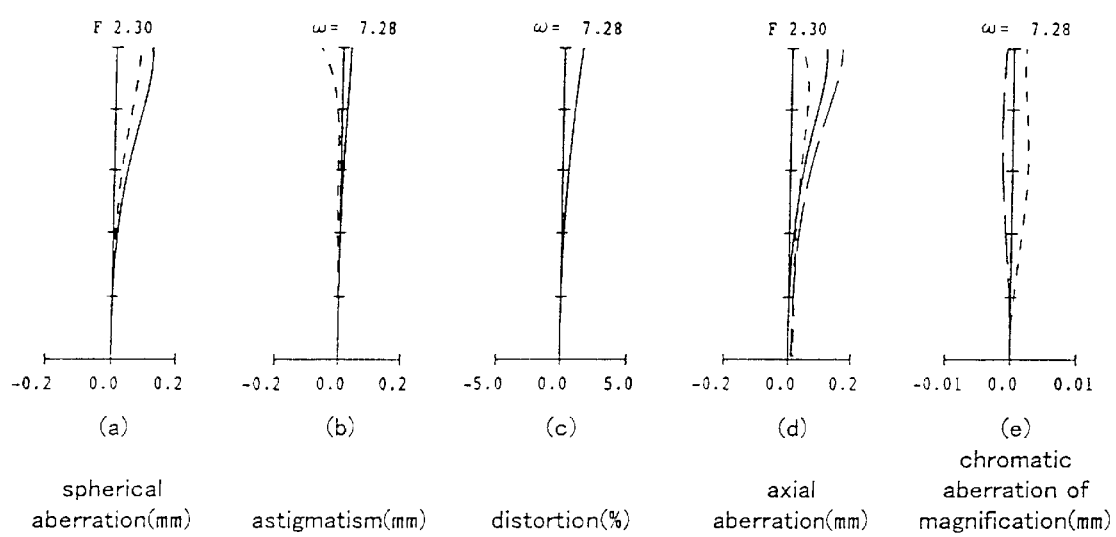
FIG. 19 is a graph showing the aberration performance at the standard position of the zoom lens according to Example 6 of the present invention.
Figure 20:
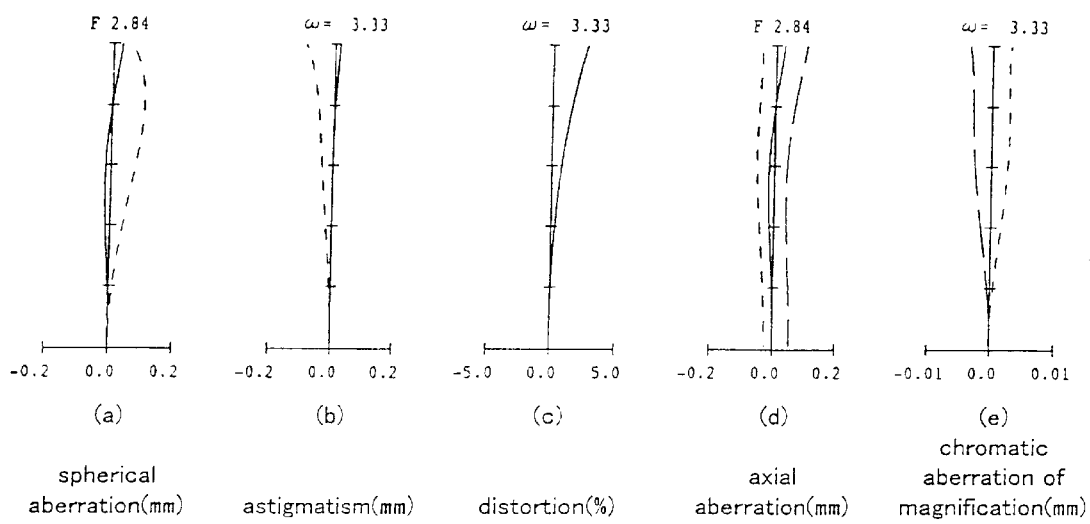
FIG. 20 is a graph showing the aberration at a telephoto end of the zoom lens according to Example 6 of the present invention.

FIGS. 18 to 20 show the aberration performance of the aspheric zoom lens shown in Table 16 according to Example 6. Each figure shows that the zoom lens according to Example 6 has an excellent optical performance.

EXAMPLE 7

In Example 7,

L/CL1=2.066 f4/L=0.288 fw/f4=0.327 are satisfied. The specific values of Example 7 are shown in the following Table 19.

TABLE 19

| Group | Surface | r | d | n | ν | CL1 |
|---|---|---|---|---|---|---|
| 1 | 1 | 33.176 | 0.65 | 1.80518 | 25.4 | 18.0 |
| | 2 | 13.288 | 4.30 | 1.60311 | 60.7 | |
| | 3 | −57.245 | 0.15 | | | |
| | 4 | 10.595 | 2.25 | 1.69680 | 55.5 | |
| | 5 | 28.608 | variable | | | |
| 2 | 6 | 28.606 | 0.50 | 1.77250 | 49.6 | |
| | 7 | 3.459 | 1.75 | | | |
| | 8 | −5.035 | 0.55 | 1.66547 | 55.2 | |
| | 9 | 3.919 | 1.55 | 1.80518 | 25.4 | |
| | 10 | 196.321 | variable | | | |
| 3 | 11 | 5.672 | 2.95 | 1.60602 | 57.7 | |
| | 12 | −10.236 | 0.10 | | | |
| | 13 | 12.191 | 1.40 | 1.60602 | 57.7 | |
| | 14 | −17.726 | 0.15 | | | |
| | 15 | −60.120 | 0.50 | 1.84666 | 23.9 | |
| | 16 | 5.153 | variable | | | |
| 4 | 17 | 6.622 | 2.00 | 1.51450 | 63.1 | |
| | 18 | −49.849 | variable | | | |
| 5 | 19 | ∞ | 3.60 | 1.51633 | 64.1 | |
| | 20 | ∞ | | | | |

The surfaces 8, 11, 12 and 17 are aspherical surfaces. Their aspheric coefficients are shown in the following Table 20.

TABLE 20

| | Surface | | | |
|---|---|---|---|---|
| | 8 | 11 | 12 | 17 |
| K | $4.70440 \times 10^{-1}$ | $-9.20354 \times 10^{-1}$ | $-5.77603$ | $1.12457$ |
| D | $4.34804 \times 10^{-4}$ | $-6.28786 \times 10^{-4}$ | $-5.95560 \times 10^{-6}$ | $-6.85352 \times 10^{-4}$ |
| E | $-1.09083 \times 10^{-4}$ | $-2.54991 \times 10^{-6}$ | $-7.77893 \times 10^{-7}$ | $-6.15819 \times 10^{-5}$ |

Next, one example of the air space that is variable by zooming is shown in the following Table 21.

TABLE 21

| | Wide-angle end | Standard position | Telephoto end |
|---|---|---|---|
| f | 3.755 | 16.246 | 35.248 |
| F/NO | 1.86 | 2.31 | 2.84 |
| 2ω (°) | 61.13 | 14.34 | 6.65 |
| d5 | 0.500 | 6.828 | 8.894 |
| d10 | 9.187 | 2.859 | 0.793 |
| d15 | 5.093 | 1.659 | 5.093 |
| d18 | 1.000 | 4.434 | 1.000 |

Figure 21:
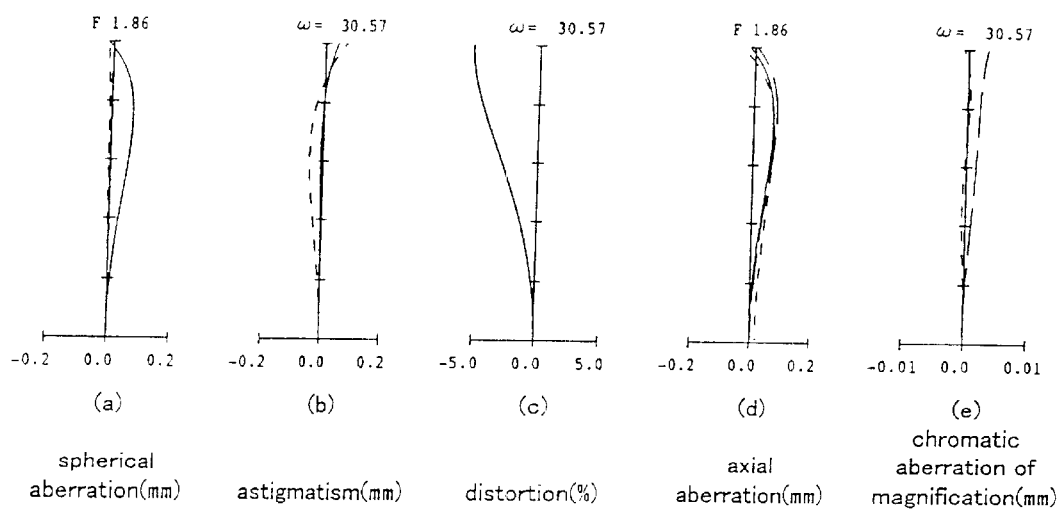
FIG. 21 is a graph showing the aberration performance at a wide-angle end of a zoom lens according to Example 7 of the present invention.
Figure 22:
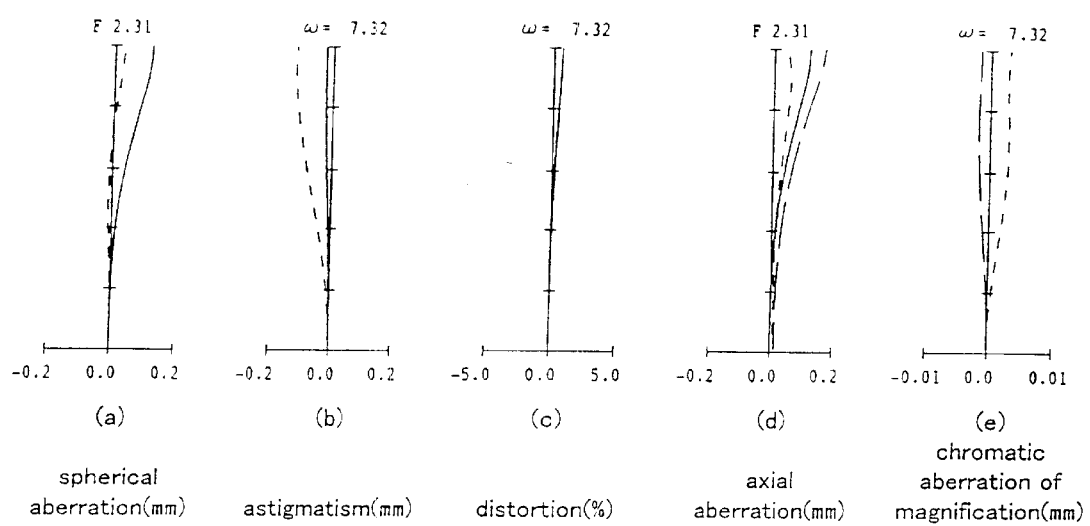
FIG. 22 is a graph showing the aberration performance at the standard position of the zoom lens according to Example 7 of the present invention.
Figure 23:
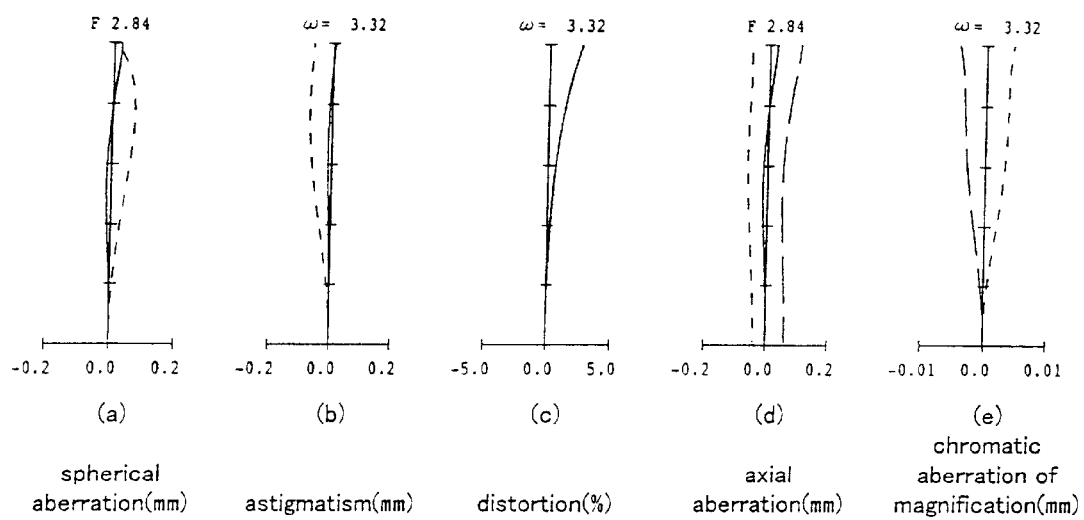
FIG. 23 is a graph showing the aberration at a telephoto end of the zoom lens according to Example 7 of the present invention.

FIGS. 21 to 23 show the aberration performance of the aspheric zoom lens shown in Table 19 according to Example 7. Each figure shows that the zoom lens according to Example 7 has an excellent optical performance.

EXAMPLE 8

In Example 8,

L/CL1=2.206 f4/L=0.299 fw/f4=0.302 are satisfied. The specific values of Example 8 are shown in the following Table 22.

TABLE 22

| Group | Surface | r | d | n | v | CL1 |
|---|---|---|---|---|---|---|
| 1 | 1 | 32.817 | 0.65 | 1.80518 | 25.4 | 18.0 |
| | 2 | 13.418 | 4.30 | 1.60311 | 60.7 | |
| | 3 | -57.282 | 0.15 | | | |
| | 4 | 10.620 | 2.25 | 1.69680 | 55.5 | |
| | 5 | 28.223 | variable | | | |
| 2 | 6 | 28.223 | 0.50 | 1.77250 | 49.6 | |
| | 7 | 3.467 | 1.75 | | | |
| | 8 | -4.893 | 0.55 | 1.66547 | 55.2 | |
| | 9 | 4.405 | 1.55 | 1.80518 | 25.4 | |
| | 10 | ∞ | variable | | | |
| 3 | 11 | 6.489 | 2.90 | 1.60602 | 57.7 | |
| | 12 | -11.660 | 0.10 | | | |
| | 13 | 11.866 | 1.40 | 1.60602 | 57.7 | |
| | 14 | -14.736 | 0.15 | | | |
| | 15 | -149.337 | 0.50 | 1.84666 | 23.9 | |
| | 16 | 5.708 | variable | | | |
| 4 | 17 | 6.773 | 2.00 | 1.51450 | 63.1 | |
| | 18 | -62.784 | variable | | | |
| 5 | 19 | ∞ | 3.60 | 1.51633 | 64.1 | |
| | 20 | ∞ | | | | |

The surfaces 8, 11, 12 and 17 are aspherical surfaces. Their aspheric coefficients are shown in the following Table 23.

TABLE 23

| | Surface | | | |
|---|---|---|---|---|
| | 8 | 11 | 12 | 17 |
| K | $5.72706 \times 10^{-1}$ | $-9.04938 \times 10^{-1}$ | $-7.61315$ | $9.27471 \times 10^{-1}$ |
| D | $6.18988 \times 10^{-4}$ | $-6.20804 \times 10^{-4}$ | $-4.08628 \times 10^{-5}$ | $-6.45963 \times 10^{-4}$ |
| E | $-7.79164 \times 10^{-5}$ | $5.35921 \times 10^{-7}$ | $4.08879 \times 10^{-7}$ | $-3.45782 \times 10^{-5}$ |

Next, example of the air space that is variable by zooming is shown in the following Table 24.

TABLE 24

| | Wide-angle end | Standard position | Telephoto end |
|---|---|---|---|
| f | 3.629 | 15.513 | 33.966 |
| F/NO | 1.80 | 2.21 | 2.74 |
| 2ω (°) | 63.04 | 15.34 | 6.91 |
| d5 | 0.500 | 6.820 | 8.886 |
| d10 | 9.187 | 2.867 | 0.801 |
| d15 | 5.093 | 1.866 | 5.093 |
| d18 | 1.000 | 4.227 | 1.000 |

Figure 24:
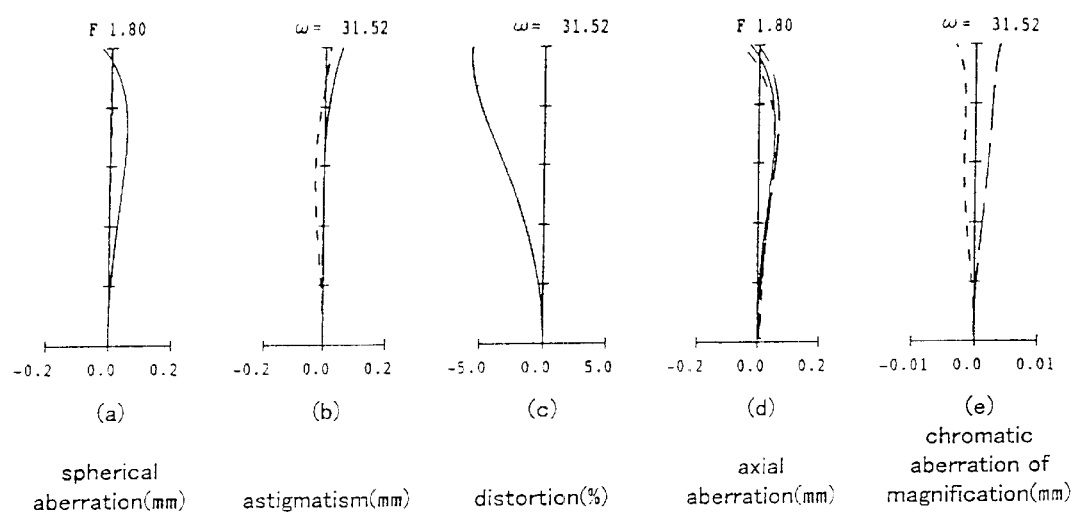
FIG. 24 is a graph showing the aberration performance at a wide-angle end of a zoom lens according to Example 8 of the present invention.
Figure 25:
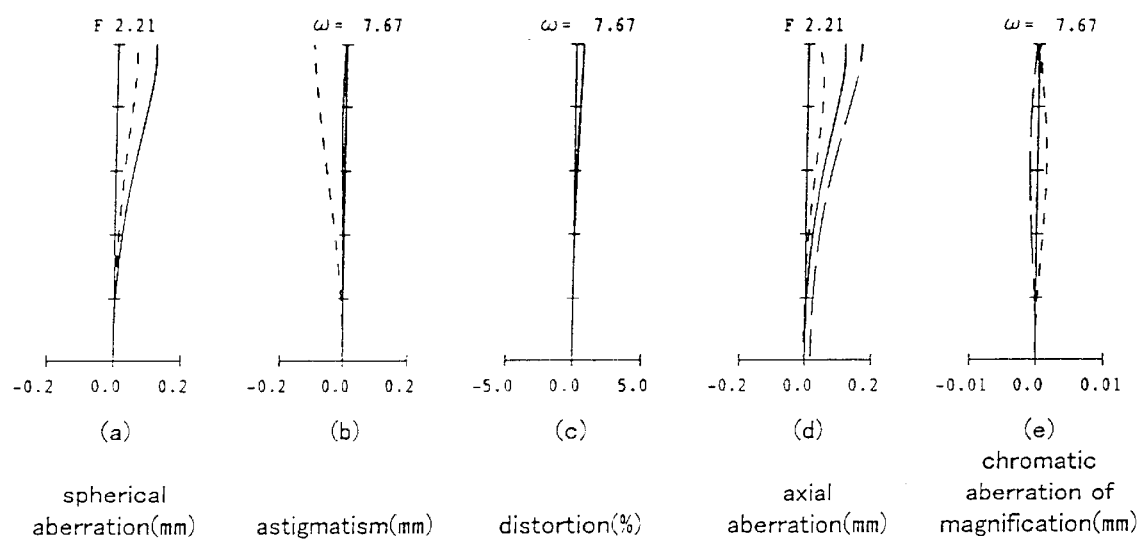
FIG. 25 is a graph showing the aberration performance at the standard position of the zoom lens according to Example 8 of the present invention.
Figure 26:
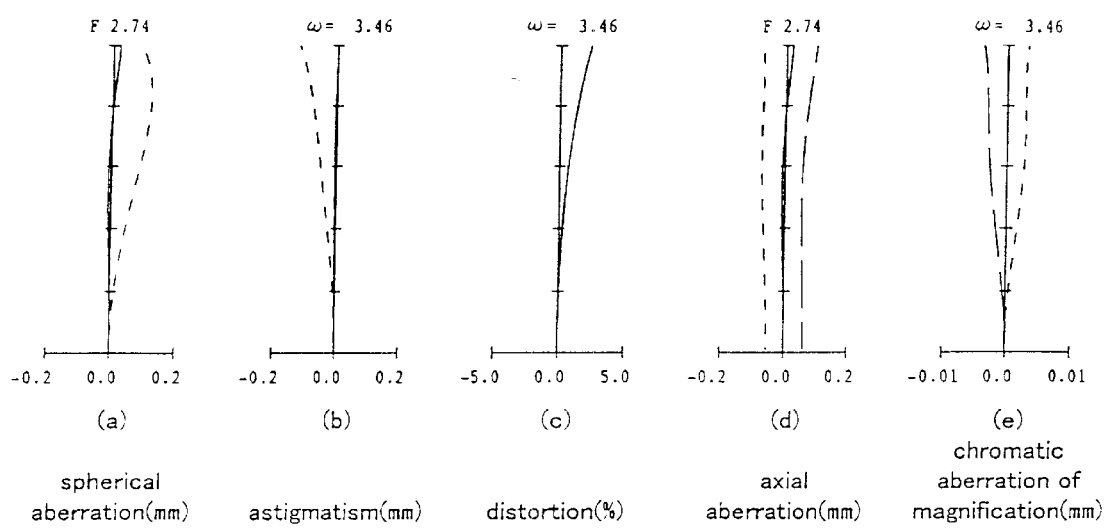
FIG. 26 is a graph showing the aberration at a telephoto end of the zoom lens according to Example 8 of the present invention.

FIGS. 24 to 26 show the aberration performance of the aspheric zoom lens shown in Table 22 according to Example 8. Each figure shows that the zoom lens according to Example 8 has an excellent optical performance.

EXAMPLE 9

In Example 9,

L/CL1=2.078 f4/L=0.298 fw/f4=0.3 are satisfied. The specific values of Example 9 are shown in the following Table 25.

TABLE 25

| Group | Surface | r | d | n | v | CL1 |
|---|---|---|---|---|---|---|
| 1 | 1 | 32.817 | 0.65 | 1.80518 | 25.4 | 18.0 |
| | 2 | 13.418 | 4.30 | 1.60311 | 60.7 | |
| | 3 | -57.282 | 0.15 | | | |
| | 4 | 10.620 | 2.25 | 1.69680 | 55.5 | |
| | 5 | 28.223 | variable | | | |
| 2 | 6 | 28.223 | 0.50 | 1.77250 | 49.6 | |
| | 7 | 3.467 | 1.75 | | | |
| | 8 | -4.893 | 0.55 | 1.66547 | 55.2 | |
| | 9 | 4.045 | 1.80 | 1.80518 | 25.4 | |
| | 10 | ∞ | variable | | | |
| 3 | 11 | 7.113 | 2.60 | 1.60602 | 57.7 | |
| | 12 | -13.648 | 0.10 | | | |
| | 13 | 11.428 | 1.70 | 1.60602 | 57.7 | |
| | 14 | -12.393 | 0.15 | | | |
| | 15 | -182.708 | 0.50 | 1.84666 | 23.9 | |
| | 16 | 5.995 | variable | | | |
| 4 | 17 | 6.769 | 2.00 | 1.51450 | 63.1 | |
| | 18 | -63.213 | variable | | | |
| 5 | 19 | ∞ | 3.60 | 1.51633 | 64.1 | |
| | 20 | ∞ | | | | |

The shape of the aspherical surface is defined by the above-mentioned equation (26). Moreover, the surfaces 8, 11, 12 and 17 are aspherical surfaces. Their aspheric coefficients are shown in the following Table 26.

TABLE 26

| | Surface | | | |
|---|---|---|---|---|
| | 8 | 11 | 12 | 17 |
| K | $5.72706 \times 10^{-1}$ | $-9.18792 \times 10^{-1}$ | $-1.00164 \times 10$ | $7.87197 \times 10^{-1}$ |
| D | $6.18988 \times 10^{-4}$ | $-6.25494 \times 10^{-4}$ | $-4.02041 \times 10^{-5}$ | $-6.77046 \times 10^{-4}$ |
| E | $-7.79164 \times 10^{-5}$ | $-3.11196 \times 10^{-6}$ | $-4.08879 \times 10^{-7}$ | $-2.70635 \times 10^{-5}$ |

Next, one example of the air space that is variable by zooming is shown in the following Table 27.

TABLE 27

| | Wide-angle end | Standard position | Telephoto end |
|---|---|---|---|
| F | 3.595 | 15.341 | 33.672 |
| F/NO | 1.79 | 2.18 | 2.71 |
| 2ω (°) | 63.51 | 15.54 | 6.99 |
| d5 | 0.500 | 6.820 | 8.888 |
| d10 | 9.187 | 2.867 | 0.799 |
| d15 | 5.093 | 1.937 | 5.093 |
| d18 | 1.000 | 4.156 | 1.000 |

Figure 27:
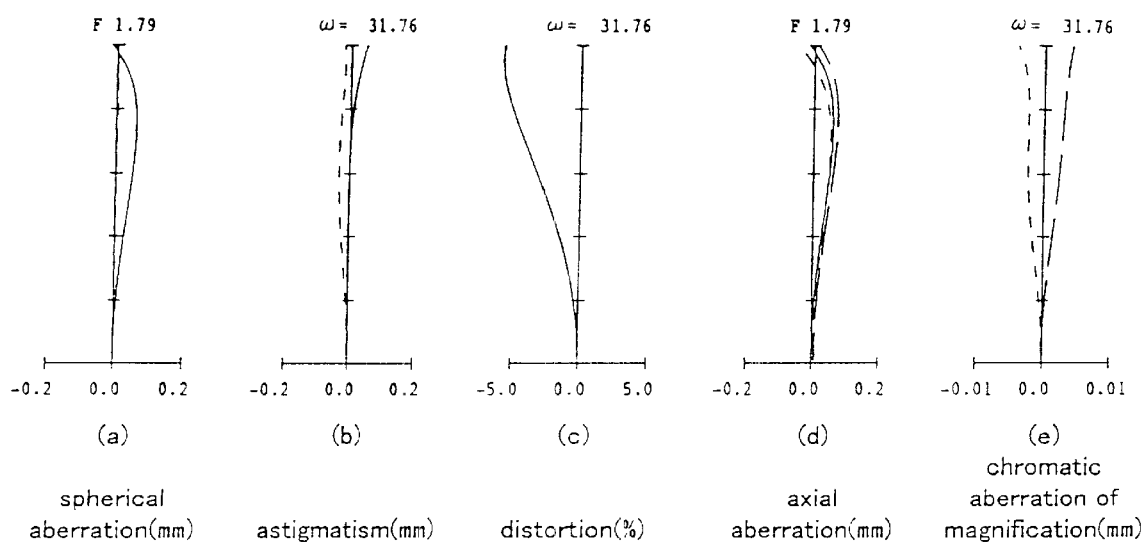
FIG. 27 is a graph showing the aberration performance at a wide-angle end of a zoom lens according to Example 9 of the present invention.
Figure 28:
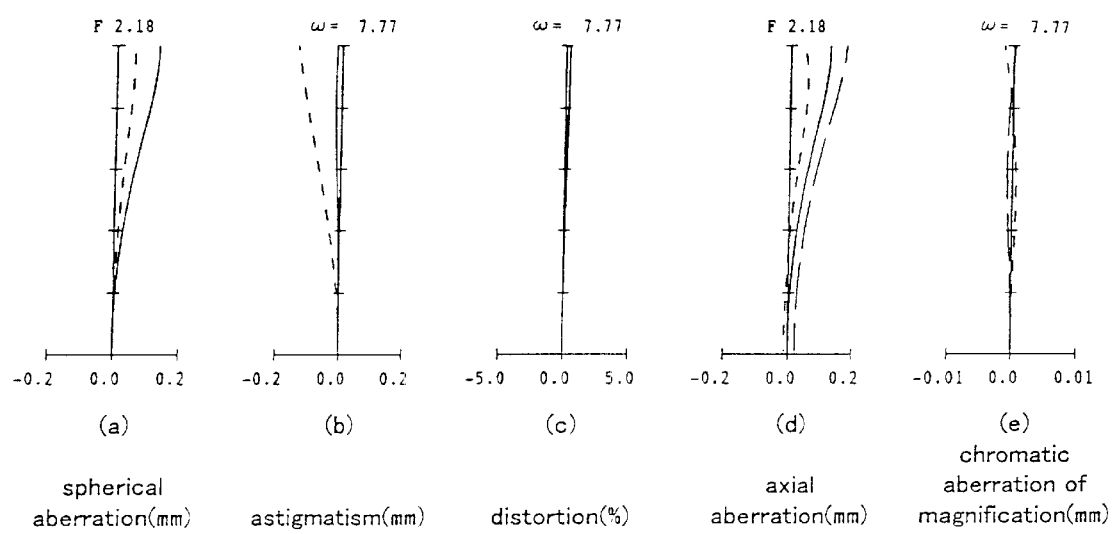
FIG. 28 is a graph showing the aberration performance at the standard position of the zoom lens according to Example 9 of the present invention.
Figure 29:
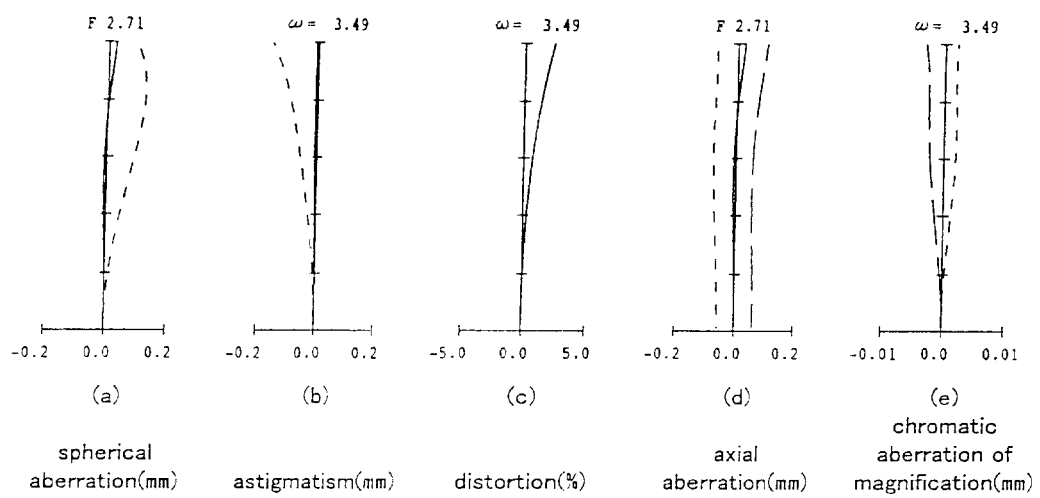
FIG. 29 is a graph showing the aberration at a telephoto end of the zoom lens according to Example 9 of the present invention.

FIGS. 27 to 29 show the aberration performance of the aspheric zoom lens shown in the above-mentioned Table 25 according to Example 9. Each figure shows that the zoom lens according to Example 9 has an excellent optical performance.

EXAMPLE 10

In Example 1,

L/C1=2.235 f4/L=0.250 fw/f4=0.376 are satisfied. The specific values of Example 10 are shown in the following Table 28.

TABLE 28

| Group | Surface | r | d | n | v | CL1 |
|---|---|---|---|---|---|---|
| 1 | 1 | 34.159 | 0.65 | 1.80518 | 25.4 | 18.0 |
| | 2 | 13.296 | 4.30 | 1.60311 | 60.7 | |
| | 3 | -54.585 | 0.15 | | | |
| | 4 | 10.756 | 2.25 | 1.69680 | 55.5 | |
| | 5 | 30.429 | variable | | | |
| 2 | 6 | 30.429 | 0.50 | 1.77250 | 49.6 | |
| | 7 | 3.520 | 1.75 | | | |
| | 8 | -5.116 | 0.55 | 1.66547 | 55.2 | |
| | 9 | 3.882 | 1.80 | 1.80518 | 25.4 | |
| | 10 | 108.467 | variable | | | |
| 3 | 11 | 5.040 | 2.90 | 1.60602 | 57.7 | |
| | 12 | -8.315 | 0.10 | | | |
| | 13 | 19.451 | 1.40 | 1.60602 | 57.7 | |
| | 14 | -20.588 | 0.15 | | | |
| | 15 | -67.178 | 0.50 | 1.84666 | 23.9 | |
| | 16 | 4.569 | variable | | | |
| 4 | 17 | 6.264 | 2.00 | 1.51450 | 63.1 | |
| | 18 | -25.656 | variable | | | |
| 5 | 19 | ∞ | 3.60 | 1.51633 | 64.1 | |
| | 20 | ∞ | | | | |

The surfaces 8, 11, 12 and 17 are aspherical surfaces. The aspheric coefficients are shown in the following Table 29.

TABLE 29

| | Surface | | | |
|---|---|---|---|---|
| | 8 | 11 | 12 | 17 |
| K | $5.70692 \times 10^{-1}$ | $-9.26017 \times 10^{-1}$ | $-5.57805$ | $9.41037 \times 10^{-1}$ |
| D | $4.62486 \times 10^{-4}$ | $-5.95705 \times 10^{-4}$ | $1.51226 \times 10^{-6}$ | $-7.34661 \times 10^{-4}$ |
| E | $-1.03569 \times 10^{-4}$ | $-3.71927 \times 10^{-6}$ | $-3.71927 \times 10^{-6}$ | $-4.83295 \times 10^{-5}$ |

Next, one example of the air space that is variable by zooming is shown in the following Table 30.

TABLE 30

| | Wide-angle end | Standard position | Telephoto end |
|---|---|---|---|
| F | 3.755 | 16.199 | 35.180 |
| F/NO | 1.87 | 2.30 | 2.84 |
| 2ω (°) | 61.12 | 14.52 | 6.65 |
| d5 | 0.500 | 6.821 | 8.887 |
| d10 | 9.187 | 2.866 | 0.800 |
| d15 | 5.093 | 1.847 | 5.093 |
| d18 | 1.000 | 4.246 | 1.000 |

Figure 30:
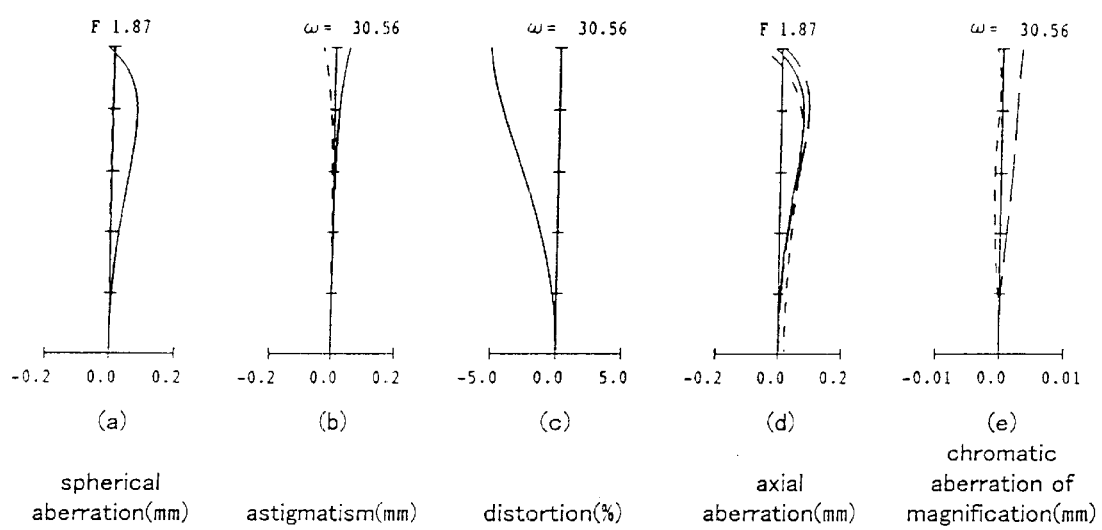
FIG. 30 is a graph showing the aberration performance at a wide-angle end of a zoom lens according to Example 10 of the present invention.
Figure 31:
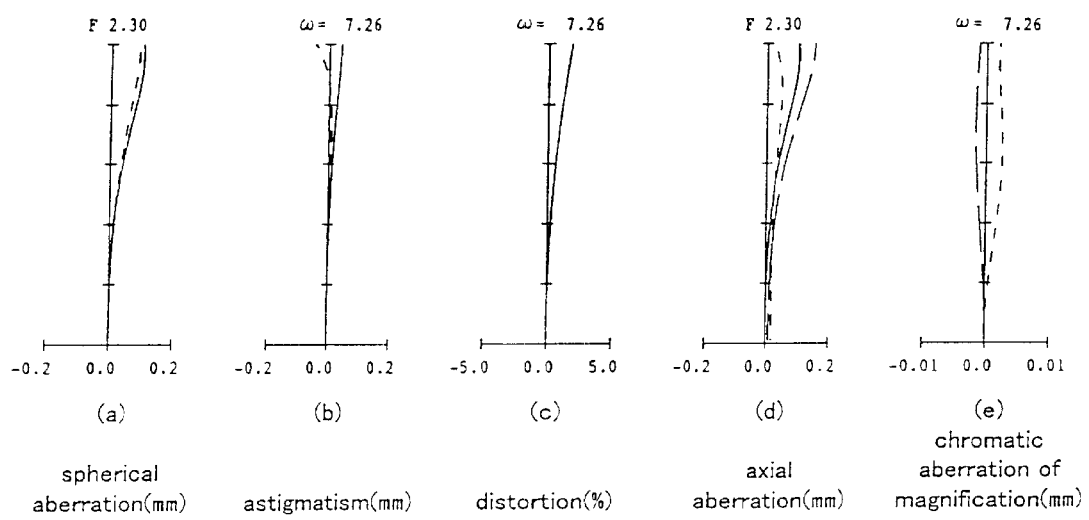
FIG. 31 is a graph showing the aberration performance at the standard position of the zoom lens according to Example 10 of the present invention.
Figure 32:
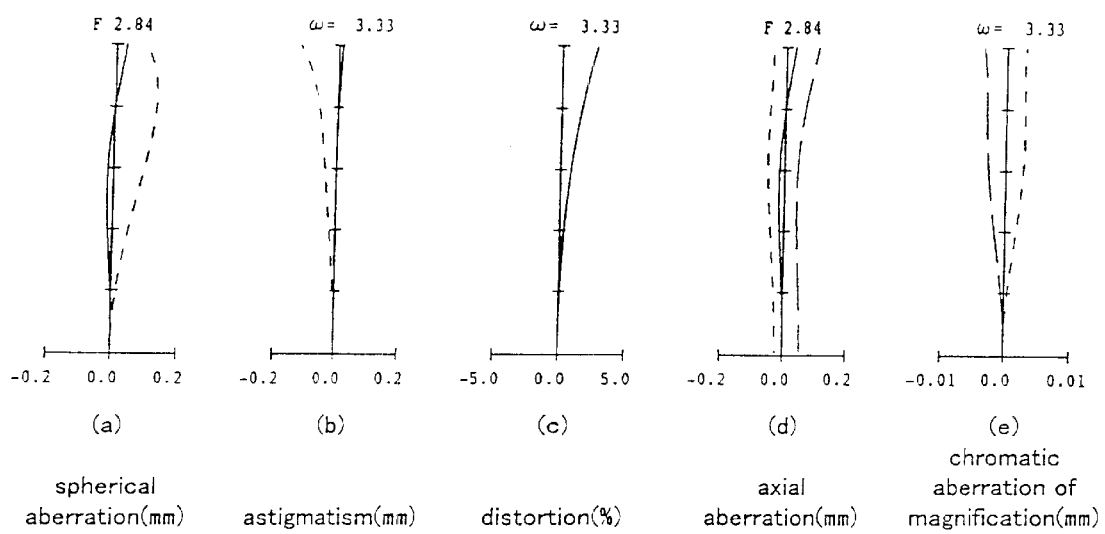
FIG. 32 is a graph showing the aberration at a telephoto end of the zoom lens according to Example 10 of the present invention.

FIGS. 30 to 32 show the aberration performance of the aspheric zoom lens shown in Table 28 according to Example 1. Each figure shows that the zoom lens according to Example 10 has an excellent optical performance.

As mentioned above, according to the zoom lens of the present invention, a compact and wide-angle zoom lens having a few lenses such as ten, a zoom ratio of about 10 times and an angle of view of about 60 or more can be attained.

According to the above-mentioned video camera of the present invention, since it uses the zoom lens of the present invention, a video camera having a small size, light weight and high performance can be attained. According to the electronic still camera of the present invention, since it uses the zoom lens of the present invention, the electric still camera having a small size, light weight and high performance can be realized.

INDUSTRIAL APPLICABILITY

As mentioned above, according to the zoom lens of the present invention, a compact and wide-angle zoom lens having a few lenses such as ten, a zoom ratio of about 10 times and an angle of view of about 60° or more can be attained. Therefore, the zoom lens of the present invention can be applied to zoom lenses of a video camera or an electronic still camera.

What is claimed is:

1. A zoom lens comprising, in the order of an increasing distance from an object, a first lens group having a positive refractive power and being fixed with respect to an image plane, a second lens group having a negative refractive power and being in charge of a variable power action by being moved on an optical axis, a third lens group having a positive refractive power and being fixed with respect to the image plane, and a fourth lens group having a positive refractive power and moving on the optical axis so that it keeps the image plane following up the movement of the second lens group and the object at a constant position with respect to a standard plane, wherein said first lens group comprises, in the order of an increasing distance from the object, a lens having a negative refractive power, a lens having a positive refractive power, and a meniscus lens having a positive refractive power and having a convex surface facing the object side;

said second lens group comprises, in the order of an increasing distance from the object, a lens having a negative refractive power, a biconcave lens having a negative refractive power, and a lens having a positive refractive power, having a convex surface facing the object side, and being connected to said biconcave lens;

said third lens group comprises, in the order of an increasing distance from the object, a biconvex lens having a positive refractive power, a lens having a positive refractive power and having a convex surface facing the object side, and a lens having a negative refractive power, wherein said lens having a negative refractive power of said third lens group is connected to the lens having a positive refractive power and having a convex surface facing the object side of said third lens group, said lens having a negative refractive lens of said third lens group has a concave surface facing the side of the image plane, and said connected lenses as a whole have negative refractive power;

said forth lens group comprises one lens;

each of said second lens group, the third lens group and the fourth lens group contains at least one aspherical surface; and the following relationships are satisfied:

$2.0 < L/CL1 < 2.3,$ $0.2 < f4/L < 0.35,$ and $0.3 < fw/f4 < 0.4$ where CL1 is an effective aperture of the lens positioned closest to the object in said first lens group, L is a distance between the lens positioned closest to the object in said first lens group and the image plane, f4 is a focal distance of said fourth lens group, and fw is a focal distance at a wide-angle end.

2. The zoom lens according to claim 1 wherein a zoom ratio is approximately 10 times.

3. A video camera, which uses the zoom lens of claim 1.

4. An electronic still camera, which uses the zoom lens of claim 1.

5. A zoom lens comprising, in the order of an increasing distance from an object, a first lens group having a positive refractive power and being fixed with respect to an image plane, a second lens group having a negative refractive power and being in charge of a variable power action by being moved on an optical axis, a third lens group having a positive refractive power and being fixed with respect to the image plane, and a fourth lens group having a positive refractive power and moving on the optical axis so that it keeps the image plane following up the movement of the second lens group and the object at a constant position with respect to a standard plane, wherein said first lens group comprises, in the order of an increasing distance from the object, a lens having a negative refractive power, a lens having a positive refractive power, and a meniscus lens having a positive refractive power and having a convex surface facing the object side;

said second lens group comprises, in the order of an increasing distance from the object, a lens having a negative refractive power, a biconcave lens having a negative refractive power, and a lens having a positive refractive power, having a convex surface facing the object side, and being connected to said biconcave lens;

said third lens group comprises, in the order of an increasing distance from the object, a biconvex lens having a positive refractive power, a lens having a positive refractive power and having a convex surface facing the object side, and a lens having a negative refractive power, wherein said lens having a negative refractive power of said third lens group is separated by an air space with respect to the lens having a positive refractive power and having a convex surface facing the object side of said third lens group;

said fourth lens group comprises one lens;

each of said second lens group, the third lens group and the fourth lens group contains at least one aspherical surface; and the following relationships are satisfied:

$1.8 < L/CL1 < 2.3,$ $0.2 < f4/L < 0.35$ and $0.25 < fw/f4 < 0.4$ where CL1 is an effective aperture of the lens positioned closest to the object in said first lens group, L is a distance from the lens positioned closest to the object in said first lens group to the image plane, f4 is a focal distance of said fourth lens group and fw is a focal distance at a wide-angle end.

6. The zoom lens according to claim 5, wherein a zoom ratio is approximately 10 times.

7. A video camera, which uses the zoom lens of claim 5.

8. A video camera, which uses the zoom lens of claim 2.

9. An electronic still camera, which uses the zoom lens of claim 5.

10. An electronic still camera, which uses the zoom lens of claim 2.

* * * * *